(12) United States Patent
Yamada et al.

(10) Patent No.: US 7,266,078 B2
(45) Date of Patent: Sep. 4, 2007

(54) LINE BACKUP METHOD AND SYSTEM

(75) Inventors: Hiroshi Yamada, Fukuoka (JP);
Takashi Kato, Fukuoka (JP);
Fumiharu Etoh, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,131

(22) Filed: Jan. 4, 1999

(65) Prior Publication Data
US 2003/0137933 A1 Jul. 24, 2003

(30) Foreign Application Priority Data
Jan. 12, 1998 (JP) ................. 10-003707

(51) Int. Cl.
*H04L 1/00* (2006.01)
(52) U.S. Cl. ...................... 370/225; 370/248
(58) Field of Classification Search ........ 370/216–228, 370/241–251; 714/1–2; 340/825.01
See application file for complete search history.

(56) References Cited

U.S. PATENT DOCUMENTS

| | | | | |
|---|---|---|---|---|
| 4,680,776 A | * | 7/1987 | Ikeuchi et al. | 370/228 |
| 5,010,550 A | * | 4/1991 | Hirata | 370/228 |
| 5,193,086 A | * | 3/1993 | Satomi et al. | 370/228 |
| 5,412,376 A | * | 5/1995 | Chujo et al. | 370/228 |
| 5,495,471 A | * | 2/1996 | Chow et al. | 370/228 |
| 5,659,540 A | * | 8/1997 | Chen et al. | 370/249 |
| 5,663,949 A | * | 9/1997 | Ishibashi et al. | 370/228 |
| 5,715,237 A | * | 2/1998 | Akiyoshi | 370/228 |
| 5,781,528 A | * | 7/1998 | Sato et al. | 370/218 |
| 5,856,981 A | * | 1/1999 | Voelker | 714/712 |
| 5,870,382 A | * | 2/1999 | Tounai et al. | 370/228 |
| 5,926,102 A | * | 7/1999 | Chun et al. | 340/5.3 |
| 6,023,455 A | * | 2/2000 | Takahashi | 370/249 |
| 6,028,861 A | * | 2/2000 | Soirinsuo et al. | 370/225 |
| 6,038,219 A | * | 3/2000 | Mawhinney et al. | 370/242 |
| 6,041,037 A | * | 3/2000 | Nishio et al. | 370/228 |
| 6,154,448 A | * | 11/2000 | Petersen et al. | 370/248 |
| 6,181,680 B1 | * | 1/2001 | Nagata et al. | 370/248 |

FOREIGN PATENT DOCUMENTS

| | | | |
|---|---|---|---|
| JP | 4-157942 | | 5/1992 |
| JP | 7-162435 | | 6/1995 |
| JP | 09074412 | * | 3/1997 |
| JP | 9-93260 | | 4/1997 |
| JP | 09238146 | * | 9/1997 |

* cited by examiner

*Primary Examiner*—Steven Nguyen
(74) *Attorney, Agent, or Firm*—Katten Muchin Rosenman LLP

(57) ABSTRACT

A control PVC is set up on a line connecting between exchange units, and periodic communication is performed between the exchange units using the control PVC. The periodic communication is monitored at each exchange unit for detection of a line failure and, at each exchange unit, a connection on the line is automatically switched over to a reserve connection in the event of a line failure. For manual switchover of a connection set up between the exchange units, a manual switchover request is issued from a maintenance console connected to one of the exchange units and, in response to the request, switchover request information is sent to the other exchange unit. The exchange unit that received the switchover request information switches the connection over to a reserve connection, and returns a switchover completion notification. The exchange unit that received the switchover completion notification switches the connection over to a reserve connection.

6 Claims, 34 Drawing Sheets

| |
|---|
| MESSAGE IDENTIFIER<br>　·PERIODIC COMMUNICATION (=0)<br>　·AUTOMATIC SWITCHOVER (=1)<br>　·MANUAL SWITCHOVER (=2) ～19a |
| PERIODIC COMMUNICATION TYPE<br>　·ACKNOWLEDGEMENT REQUEST (=0)<br>　·RESPONSE NOTIFICATION (=1) ～19b |
| AUTOMATIC SWITCHOVER<br>　·SWITCHOVER REQUEST (=0)<br>　·PROCESSING COMPLETION NOTIFICATION (=1) ～19c |
| MANUAL SWITCHOVER<br>　·SWITCHOVER REQUEST (=0)<br>　·PROCESSING COMPLETION NOTIFICATION (=1) ～19d |
| DETAILED INFORMATION 1<br>　·PRIMARY LINE NUMBER (=0~) ～19e |
| DETAILED INFORMATION 2<br>　·OTHER INFORMATION STORAGE AREA ～19f |

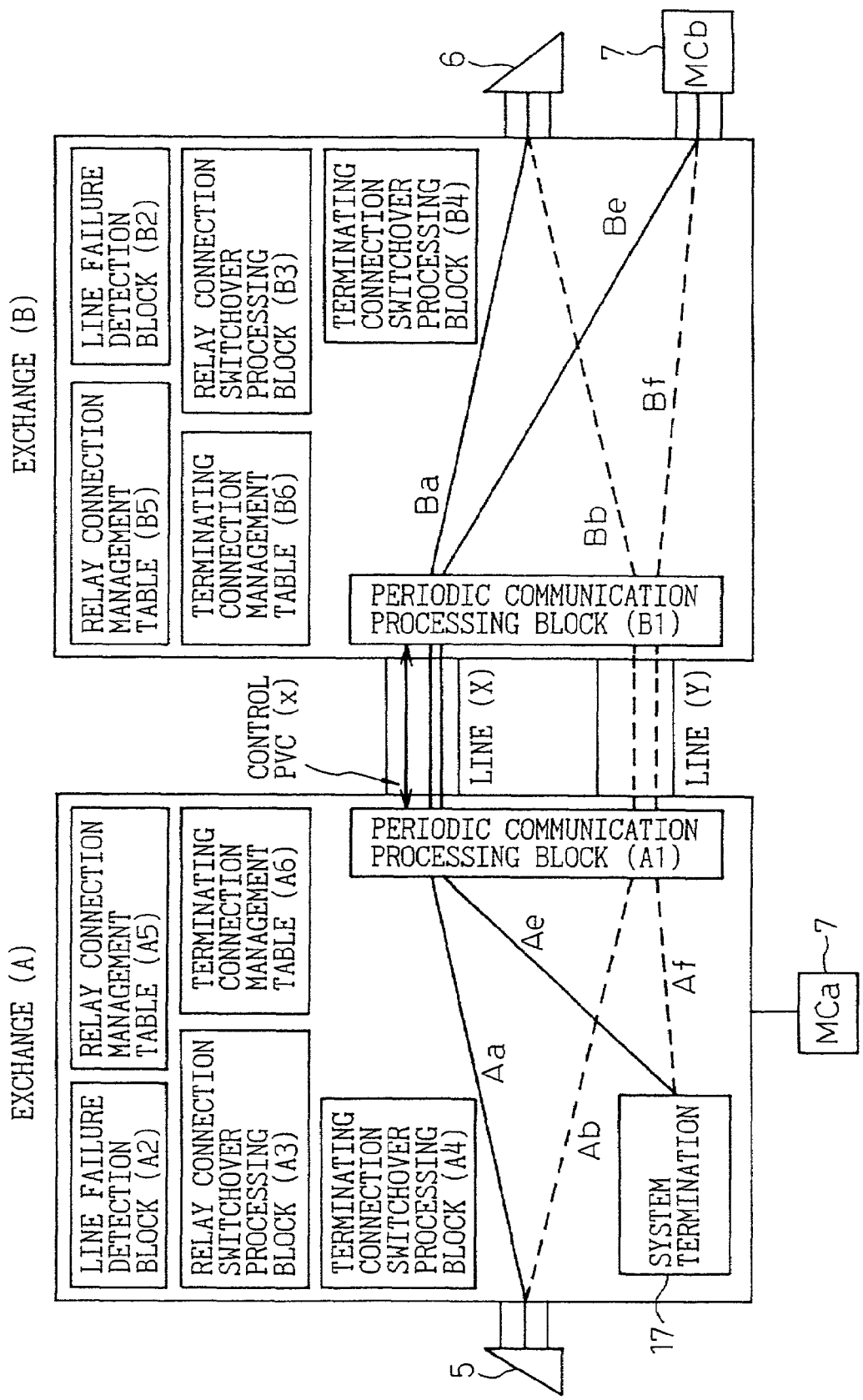

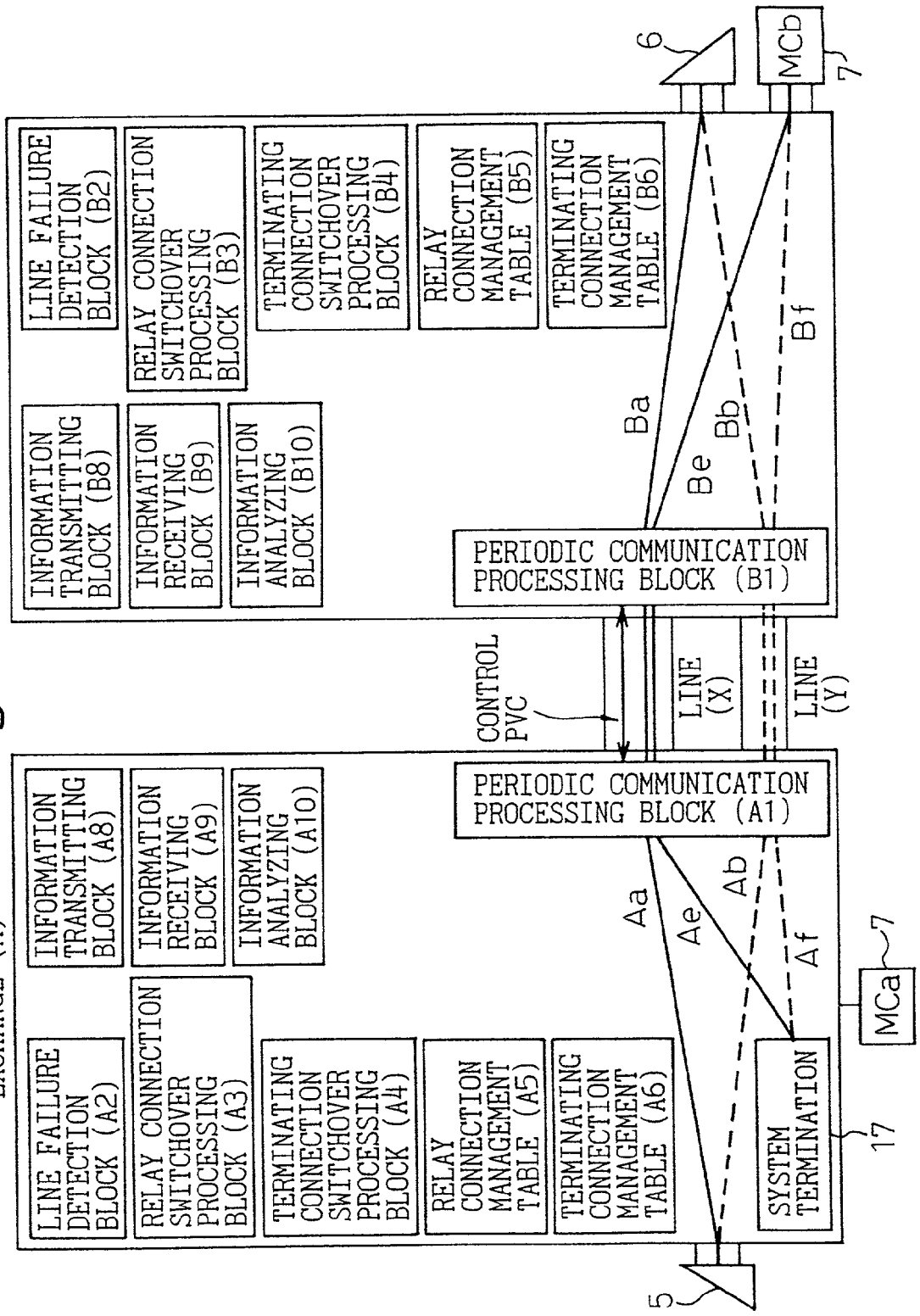

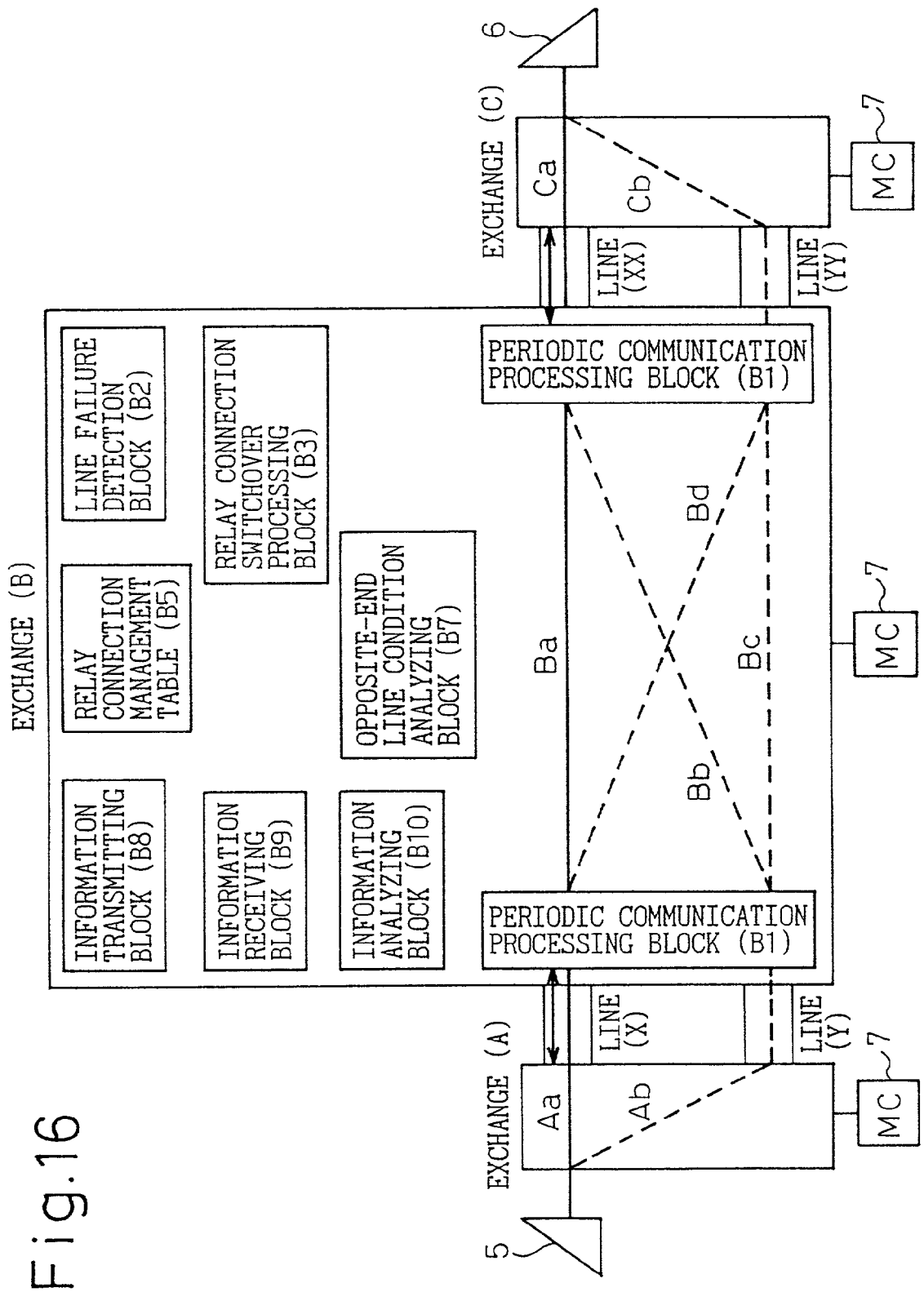

Fig. 26A

RELAY CONNECTION MANAGEMENT TABLE

| | | |
|---|---|---|
| LINE NUMBER 1 | LOCAL NODE NUMBER | A |
| LINE NUMBER 2 | REMOTE-END NODE NUMBER | B |
| LINE NUMBER 3 | RESERVE LINE REMOTE-END NODE NUMBER | B |
| LINE NUMBER 4 | RESERVE LINE NUMBER | Z |
| | PRIMARY CONNECTION VP IDENTIFIER | 0 |
| | PRIMARY CONNECTION VC IDENTIFIER | 100 |
| | BACKUP CONNECTION VP IDENTIFIER | 0 |
| | BACKUP CONNECTION VC IDENTIFIER | 100 |
| | BACKUP CONNECTION QOS | 1 |
| LINE NUMBER X | BACKUP CONNECTION USAGE BANDWIDTH | 100 |
| | OTHER BACKUP CONNECTION ATTRIBUTES | — |
| | OTHER NODE RELAY FLAG | off |
| | OPPOSITE-END LINE BACKUP AVAILABILITY FLAG | off |
| | LOCAL NODE NUMBER | A |
| | REMOTE-END NODE NUMBER | B |
| | RESERVE LINE REMOTE-END NODE NUMBER | B |
| | RESERVE LINE NUMBER | Z |
| | PRIMARY CONNECTION VP IDENTIFIER | 0 |
| | PRIMARY CONNECTION VC IDENTIFIER | 100 |
| | BACKUP CONNECTION VP IDENTIFIER | 0 |
| | BACKUP CONNECTION VC IDENTIFIER | 200 |
| | BACKUP CONNECTION QOS | 1 |
| LINE NUMBER Y | BACKUP CONNECTION USAGE BANDWIDTH | 100 |
| | OTHER BACKUP CONNECTION ATTRIBUTES | — |
| | OTHER NODE RELAY FLAG | off |
| | OPPOSITE-END LINE BACKUP AVAILABILITY FLAG | off |

Fig.26B

TERMINATING CONNECTION MANAGEMENT TABLE

| | |  |
|---|---|---|
| LINE NUMBER 1 | LOCAL NODE NUMBER | A |
| LINE NUMBER 2 | REMOTE-END NODE NUMBER | B |
| LINE NUMBER 3 | RESERVE LINE REMOTE-END NODE NUMBER | B |
| LINE NUMBER 4 | RESERVE LINE NUMBER (Z) | Z |
| | PRIMARY CONNECTION VP IDENTIFIER | 0 |
| | PRIMARY CONNECTION VC IDENTIFIER | 32 |
| | BACKUP CONNECTION VP IDENTIFIER | 0 |
| | BACKUP CONNECTION VC IDENTIFIER | 32 |
| | BACKUP CONNECTION QOS | 1 |
| LINE NUMBER X | BACKUP CONNECTION USAGE BANDWIDTH | 64 |
| | OTHER BACKUP CONNECTION ATTRIBUTES | – |

| | |  |
|---|---|---|
| | LOCAL NODE NUMBER | A |
| | REMOTE-END NODE NUMBER | B |
| | RESERVE LINE REMOTE-END NODE NUMBER | B |
| | RESERVE LINE NUMBER (Z) | Z |
| | PRIMARY CONNECTION VP IDENTIFIER | 0 |
| | PRIMARY CONNECTION VC IDENTIFIER | 32 |
| | BACKUP CONNECTION VP IDENTIFIER | 0 |
| | BACKUP CONNECTION VC IDENTIFIER | 64 |
| LINE NUMBER Y | BACKUP CONNECTION QOS | 1 |
| | BACKUP CONNECTION USAGE BANDWIDTH | 64 |
| | OTHER BACKUP CONNECTION ATTRIBUTES | – |

LINE BACKUP METHOD AND SYSTEM

BACKGROUND OF THE INVENTION

1. Field of the Invention

The present invention relates to a line backup method and system in an ATM (Asynchronous Transfer Mode) network and, more particularly, to a line switchover method and a system for performing line switchover in the event of a line failure between exchange units.

2. Description of the Related Art

In a traditional line backup method provisioned for a line failure between ATM exchange units or in an ATM communication network, line switchover has been performed by detecting a failure at the physical layer. In such a switchover method, switchover control is generally performed for each physical line between the exchange units at both ends of the connection, and switchover involving a third exchange unit cannot be carried out.

A connection-by-connection switchover control method for Virtual Channels (VCs) is disclosed in Japanese Unexamined Patent Publication No. 9-93260. However, since this method uses a VC AIS (Alarm Indication Signal) OAM cell to detect the occurrence of a failure and switch the connection, if transmission/reception of the OAM signal becomes impossible because of the failure, the switchover operation cannot be performed.

This method, therefore, cannot handle logical failures (e.g., software failure) occurring within an exchange unit. It is also not possible to provide for voluntary switchover performed through maintenance and administration operations from a maintenance console, etc. If a connection between exchange units is to be switched manually, the only possible way is to issue a command to switch the connection from each of the maintenance consoles connected to the exchange units at both ends, and it is, therefore, not possible to switch the connection in a synchronized fashion between the exchange units.

Furthermore, connection-by-connection switchover control is usually implemented in software. Since OAM cells for all the VC connections set up along the line arrive at the switching end station, regardless of whether the connection is a connection to be switched or not, the end station must process all of these OAM cells, and the processing logic becomes complex, involving the problem of increased processing burden and increased delay.

SUMMARY OF THE INVENTION

The present invention has been devised in view of the above-described problems, and it is an object of the present invention to provide a line backup method and a system in an ATM network that are capable of carrying out switchover procedures even in the event of a failure internal to an exchange unit, including a physical failure; that enable switchover to be accomplished through maintenance operations so as to be able to flexibly handle switchover operations in cooperation with a third exchange unit as well as voluntary switchover operations during servicing maintenance or due to increased traffic not associated with line failure; and that are simple in detection logic and capable of being implemented with relative ease because of the use of a switchover protocol involving transferring simple control signals.

According to the present invention, there is provided a line backup method comprising the steps of: setting up a permanent virtual connection on a line connecting between a first exchange unit and a second exchange unit; performing periodic communication between the first exchange unit and the second exchange unit using the permanent virtual connection; detecting a failure of the line by monitoring the periodic communication at each of the first and second exchange units; and switching a connection on the line, at each of the first and second exchange units, to a reserve connection not using the same line, in the event that a failure of the line is detected.

According to the present invention, there is also provided a line backup method in which a connection on a line connecting between a first exchange unit and a second exchange unit is switched over to a reserve connection not using the same line, comprising the steps of: sending switchover request information from the first exchange unit to the second exchange unit in response to a manual switchover request from a maintenance console connected to the first exchange unit; switching the connection over to the reserve connection at the second exchange unit in response to the switchover request information, and sending a switchover completion notification from the second exchange unit to the first exchange unit; and switching the connection over to the reserve connection at the first exchange unit in response to the switchover completion notification.

According to the present invention, there is also provided a line backup system comprising: a permanent virtual connection set up on a line connecting between a first exchange unit and a second exchange unit; a periodic communication processing block for performing periodic communication between the first exchange unit and the second exchange unit using the permanent virtual connection; a line failure detection block for detecting a failure of the line by monitoring the periodic communication at each of the first and second exchange units; and a connection switchover processing block for switching a connection on the line, at each of the first and second exchange units, to a reserve connection not using the same line, in the event that a failure of the line is detected.

According to the present invention, there is also provided a line backup system in which a connection on a line connecting between a first exchange unit and a second exchange unit is switched over to a reserve connection not using the same line, comprising: an information transmitting block for sending switchover request information from the first exchange unit to the second exchange unit in response to a manual switchover request from a maintenance console connected to the first exchange unit; a connection switchover processing block for switching the connection over to the reserve connection at the second exchange unit in response to the switchover request information; a second information transmitting block for sending a switchover completion notification from the second exchange unit to the first exchange unit; and a second connection switchover processing block for switching the connection over to the reserve connection at the first exchange unit in response to the switchover completion notification.

BRIEF DESCRIPTION OF THE DRAWINGS

FIG. 5 is a diagram showing one example of a communication format used in the present invention;

FIG. 11 is a diagram illustrating automatic switchover for connections set up between the exchange units A and B in the system of FIG. 10;

FIG. 13 is a diagram illustrating manual switchover for connections set up between the exchange units A and B in the system of FIG. 10;

FIG. 16 is a diagram illustrating automatic switchover and manual switchover for connections set up between the exchange units A, B, and C in the system of FIG. 10;

FIGS. 26A and 26B are diagrams showing examples of the relay connection management table and terminating connection management table, respectively.

DESCRIPTION OF THE PREFERRED EMBODIMENTS

The preferred embodiments of line backup according to the present invention will be described below with reference to the accompanying drawings.

Figure 1:
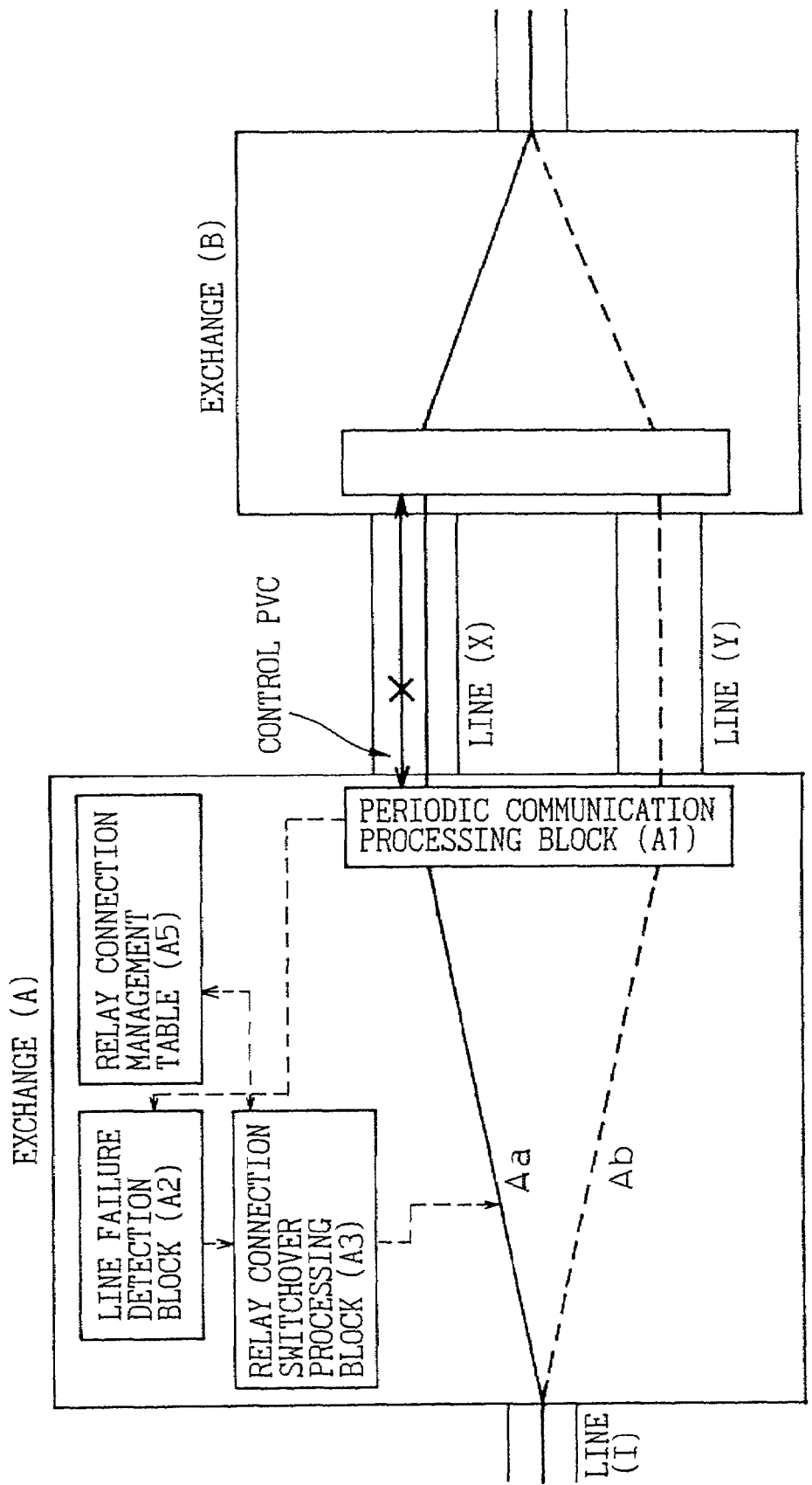
FIG. 1 is a diagram illustrating a switchover operation for a relay connection according to the present invention.

FIG. 1 is a diagram illustrating an operation when the connection to be switched by an exchange unit is a relay connection not terminating in the exchange unit. In this specification, a connection terminating in an exchange unit, such as a connection established for the remote control of the exchange unit, is called a terminating connection, and a connection not terminating in the exchange unit is called a relay connection. Accordingly, a relay connection includes not only a connection not terminating in the exchange unit but directed on to a third exchange unit, but also a connection destined for a terminal served by the exchange unit. Here, relaying of a connection directed to a third exchange unit is specifically referred to as a node relay. In FIG. 1, a first exchange unit A is connected to a second exchange unit B via a line X and a line Y. A control PVC (Permanent Virtual Connection) for detection of a failure on the line X is set up on the line X. The following description deals with the operation of the exchange unit A, but it will be recognized that the exchange unit B operates in a similar manner to accomplish connection switchover.

In the exchange unit A, reference character A1 is a periodic communication processing block which performs periodic communication with the exchange unit B using the control PVC, A2 is a line failure detection block which determines that a line failure has occurred when the information being communicated is interrupted, and A3 is a relay connection switchover processing block which, when a line failure is detected, retrieves a relay connection accommodated on the failed line and a reserve connection corresponding to it from a relay connection management table A5, and performs the processing to cut off the affected connection and set up the corresponding reserve relay connection.

In the thus configured system, the periodic communication processing block A1 performs periodic communication with the exchange unit B at the remote end via the control PVC and, when it fails to receive a periodic response message from the exchange unit B, sends a periodic communication no-response notification to the line failure detection block A2. When the periodic communication no-response notification is received more than a prescribed number of times, the line failure detection block A2 determines that a line failure has occurred, and sends an automatic switchover request to the relay connection switchover processing block A3.

The relay connection switchover processing block A3 retrieves the relay connection accommodated on the failed line X from the relay connection management table A5, while also retrieving the reserve connection for the affected relay connection stored in the table A5, and performs the processing to cut off the relay connection on the failed line and set up the reserve relay connection retrieved from the table A5.

By performing the above operation at the exchange units A and B at both ends of the communication, the relay connection set up on the failed line can be switched over to the reserve line Y. In this way, the relay connection at each of the exchange units in communication can be switched over to the reserve line Y in a synchronized fashion when a line failure occurs, and data loss at the time of communication cutoff can thus be minimized.

Figure 2:
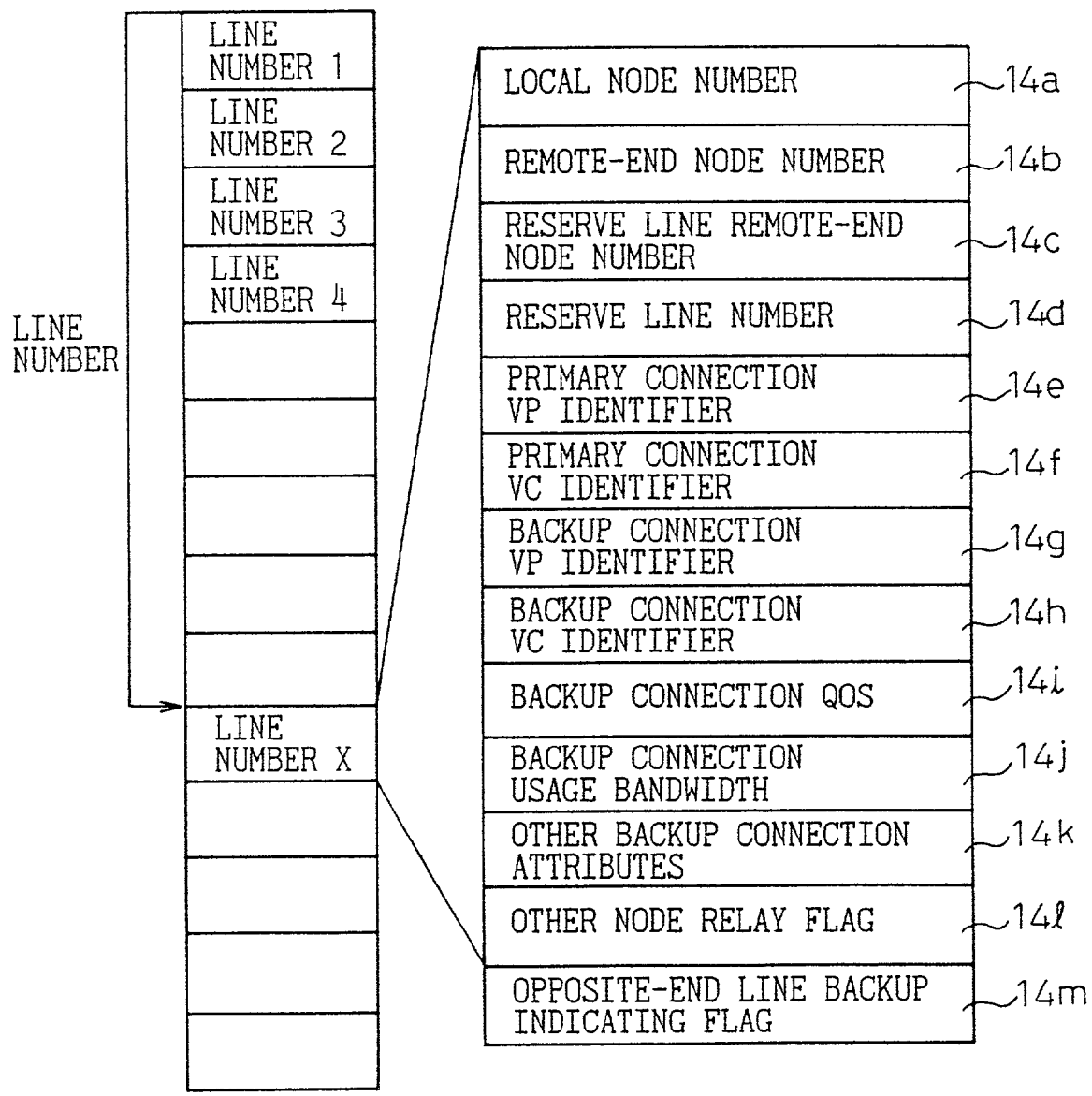
FIG. 2 is a diagram showing one example of a relay connection management table.

FIG. 2 is a diagram showing an example of the configuration of the relay connection management table A5. The relay connection management table A5 is accessed by line number. For each line number, the relay connection management table A5 stores local node number 14a, remote-end node number 14b, reserve line remote-end node number 14c, reserve line number 14d, primary connection VP identifier 14e, primary connection VC identifier 14f, backup connection VP identifier 14g, backup connection VC identifier 14h, backup connection QOS 14i, backup connection usage bandwidth 14j, other backup connection attributes 14k, other node relay flag 14l, and opposite-end line backup indicating flag 14m.

Figure 3:
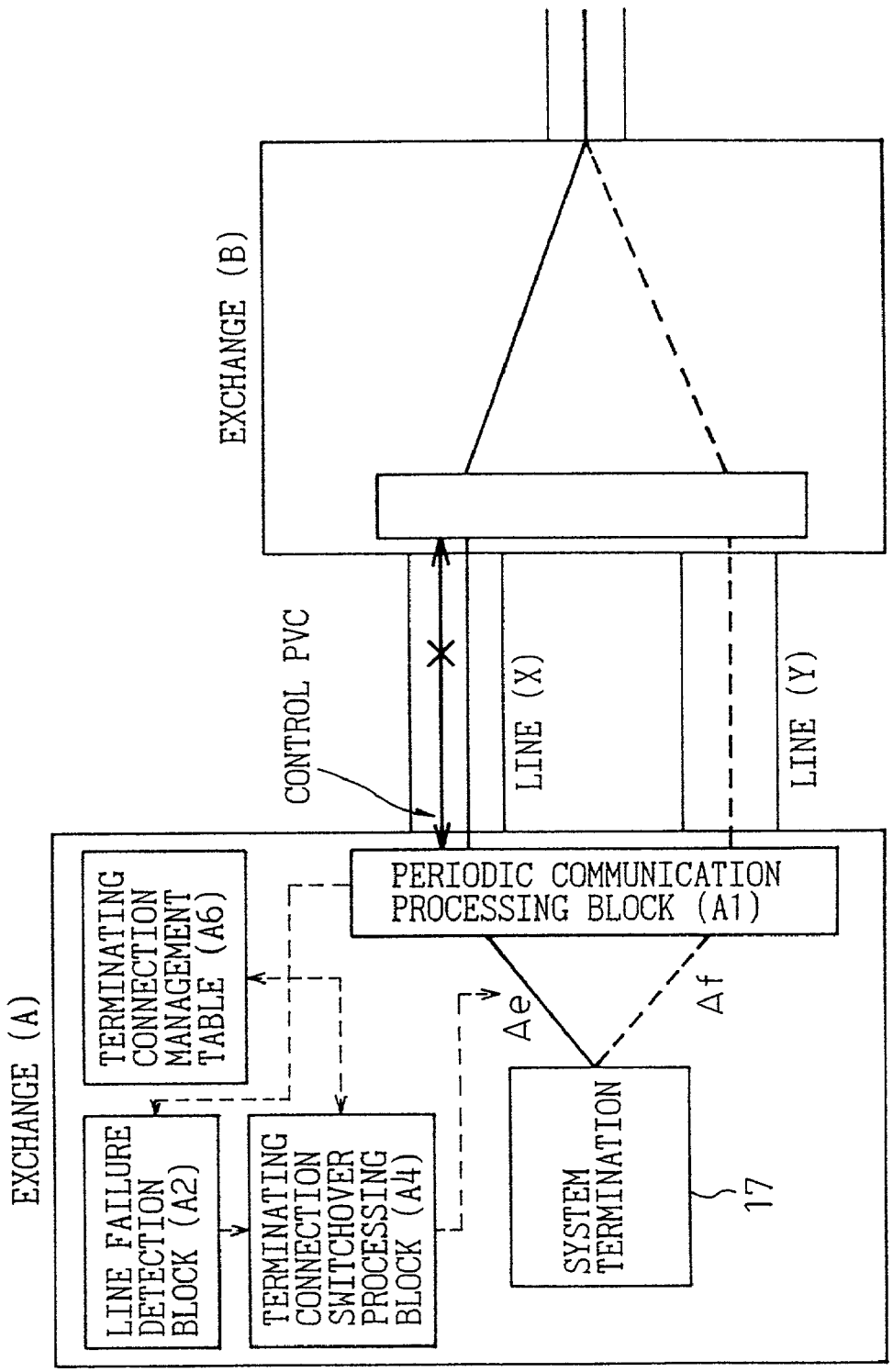
FIG. 3 is a diagram illustrating a switchover operation for a terminating connection.

FIG. 3 is a diagram showing an operation when the connection to be switched is a terminating connection. The same elements as those in FIG. 1 are designated by the same reference characters. A4 is a terminating connection switchover processing block, A6 is a terminating connection management table, and 17 is a system termination which terminates the connection in the exchange unit A.

Figure 4:
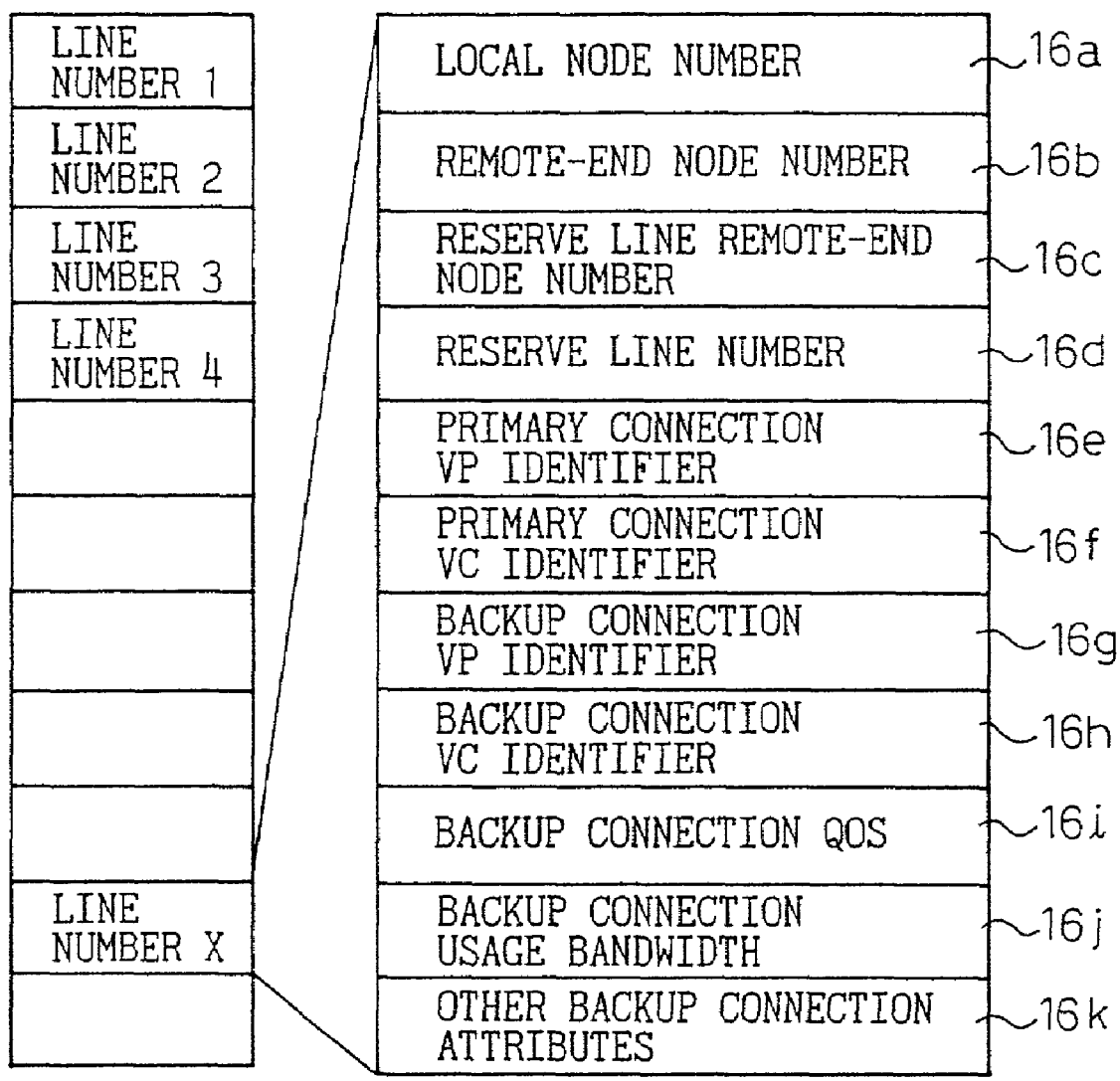
FIG. 4 is a diagram showing one example of a terminating connection management table.

FIG. 4 is a diagram showing an example of the configuration of the terminating connection management table. The table stores, for each line number, local node number 16a, remote-end node number 16b, reserve line remote-end node number 16c, reserve line number 16d, primary connection VP identifier 16e, primary connection VC identifier 16f, backup connection VP identifier 16g, backup connection VC identifier 16h, backup connection QOS 16i, backup connection usage bandwidth 16j, and other alternate connection attributes 16k.

In the thus configured system, the periodic communication processing block A1 performs periodic communication with the exchange unit B at the remote end and, when it fails to receive a periodic response message from the exchange unit B, sends a periodic communication no-response notification to the line failure detection block A2. When the periodic communication no-response notification is received more than a prescribed number of times, the line failure detection block A2 determines that a line failure has occurred, and sends an automatic switchover request to the terminating connection switchover processing block A4.

The terminating connection switchover processing block A4 retrieves the terminating connection accommodated on the failed line X from the terminating connection management table A6, while also retrieving the reserve connection for the affected terminating connection managed in the table A6, and performs the processing to cut off the terminating connection on the failed line X and set up the reserve terminating connection retrieved from the table A6.

By also performing the same relay connection switching operation as described with reference to FIG. 1 at the exchange unit B, the terminating connection on the failed line X can be switched over to the reserve line Y. In this way, the terminating connection being used for the communication can be switched over to the reserve line Y in a synchronized fashion when a line failure occurs, and data loss at the time of communication cutoff can thus be minimized.

FIG. 5 is a diagram showing an example of the communication information format used in the present invention. As shown, the information consists of message identifier 19a, periodic communication type 19b, automatic switchover information 19c, manual switchover information 19d, detailed information 1 designated by 19e, and detailed information 2 designated by 19f. The message identifier 19a indicates periodic communication when it is "0", automatic switchover when it is "1", and manual switchover when it is "2". The periodic communication type information 19b indicates an acknowledgement request when it is "0", and a response notification when it is "1". The automatic switchover information 19c indicates a switchover request when it is "0", and a processing completion notification when it is "1". The manual switchover information 19d indicates a switchover request when it is "0", and a processing completion notification when it is "1". The detailed information 1 indicates the primary line number, while the detailed information 2 shows other information storage areas.

Figure 6:
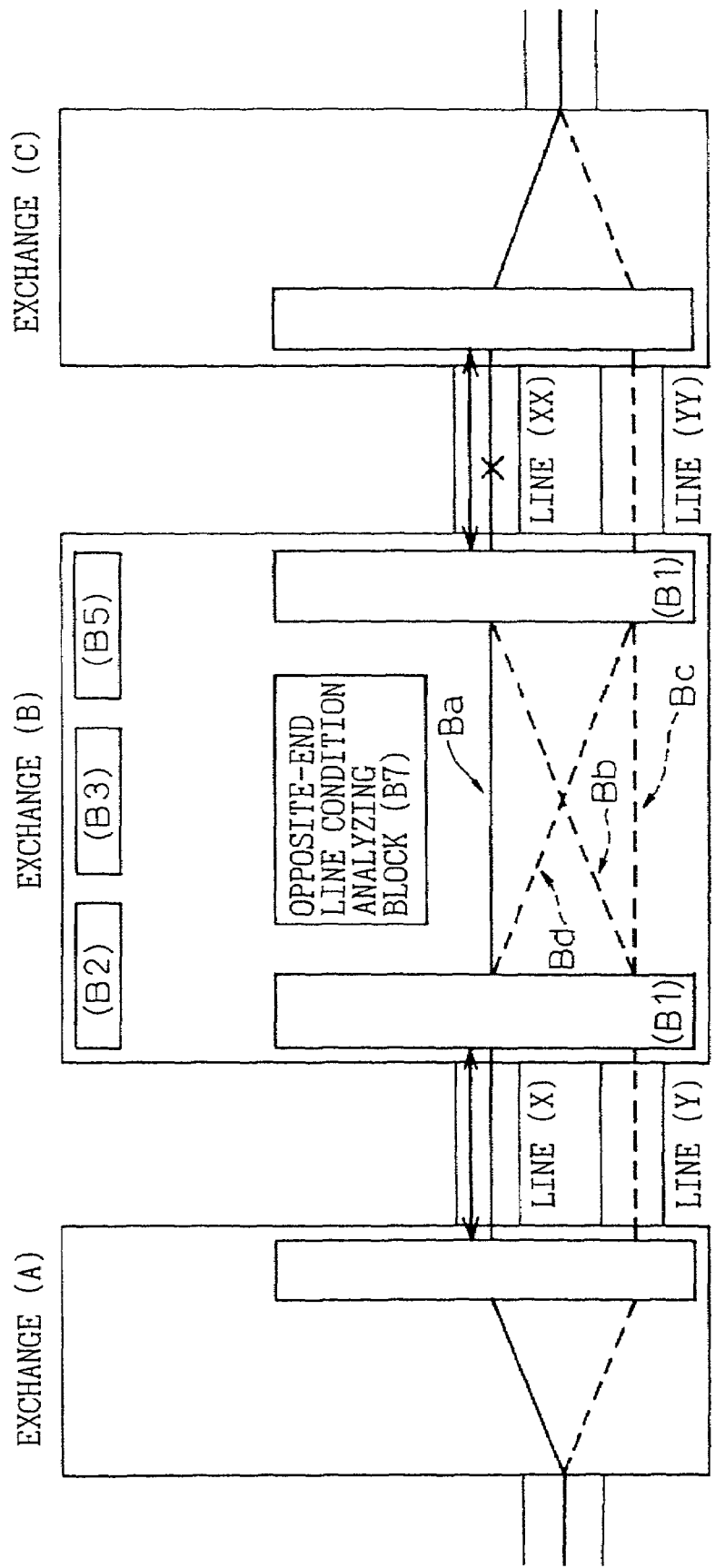
FIG. 6 is a diagram illustrating a switchover operation for connections set up between three nodes.

FIG. 6 is a diagram for explaining the switchover operation performed at the exchange unit B as an intermediate node when connections are set up between three nodes, i.e., the exchange units A, B, and C. Functional elements B1, B2, B3, and B5 in the exchange unit B respectively correspond to the functional elements A1, A2, A3, and A5 in the exchange unit A shown in FIG. 1. In FIG. 6, the exchange unit B is located between the exchange units A and C. In the exchange unit B which performs a node relay in a network where connections are set up between three or more nodes (exchange units), when a line failure is detected on the line X to and from the exchange unit A or on the line XX to and from the exchange unit C by the line failure detection block B2, the relay connection switchover processing block B3 retrieves the relay connection accommodated on the failed line by referring to the relay connection management table B5. When the connection is a connection requiring a node relay, the relay connection switchover processing block B3 notifies an opposite-end line condition analyzing block B7 of the line number at the opposite end of the connection, that is, the line number XX for the line X or the line number X for the line XX.

The notified opposite-end line condition analyzing block B7 analyzes the line condition of the opposite-end line, and reports the line condition to the relay connection switchover processing block B3. Based on the report, the relay connection switchover processing block B3 retrieves an operable reserve connection from the relay connection management table B5, and performs the processing to cut off the relay connection on the failed line and set up the reserve connection. For example, when a failure is detected on the line XX, the condition of the line X is examined, and when the condition is normal, the reserve line Bd is used. If the line X is failed, and the line Bb is already in use, then the line Bc is used. In this way, relay connections connecting between three or more nodes, including the relay connection within the exchange unit B performing the node relay, can be switched.

Accordingly, the relay connections connecting between three or more nodes can be switched in a synchronized fashion at the respective exchange units A to C involved in the communication, and data loss at the time of communication cutoff can thus be minimized.

Figure 7:
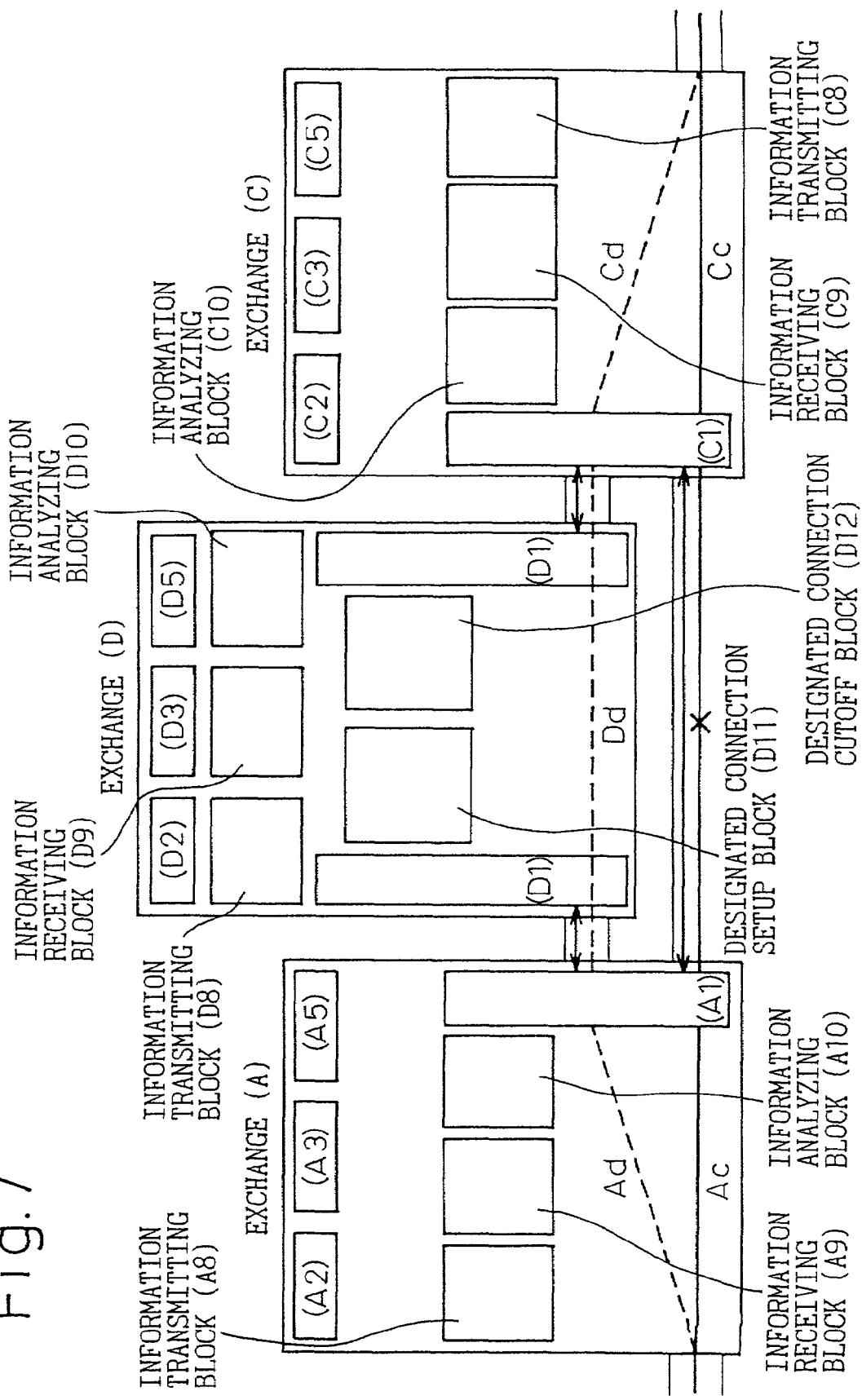
FIG. 7 is a diagram illustrating a switchover operation for switching over to a reserve connection passing through a third exchange unit.

FIG. 7 is a diagram for explaining the operation performed when a connection on a line connecting between two exchange units (exchange unit A and exchange unit C) is switched over to a reserve connection passing through a third exchange unit (exchange unit D). In FIG. 7, functional elements C1, C2, C3, and C5 in the exchange unit C and functional elements D1, D2, D3, and D5 in the exchange unit D respectively correspond to the functional elements A1, A2, A3, and A5 in the exchange unit A already described.

In the system configured as shown in FIG. 7, when a failure of the line connecting between the exchange units A and C is detected by the line failure detection blocks A2 and C2 at both of the exchange units, the detection blocks A2 and C2 notify the relay connection switchover processing blocks A3 and C3 of the failure.

The relay connection switchover processing blocks A3 and C3 detect relay connections Ac and Cc on the failed line by referring to the respective relay connection management tables A5 and C5 and, when it is recognized that their backup connections Ad and Cd are connected to an adjacent node other than the exchange unit C or A, request information transmitting blocks A8 and C8 to send out reserve connection setup request information.

Thereupon, the information transmitting blocks A8 and C8 send a switchover request signal to the exchange unit D to which the reserve lines are connected. At the exchange unit D, an information receiving block D9 receives the information from the exchange units A and C, and passes the received information to an information analyzing block D10. The information analyzing block D10 analyzes the information and sends a connection setup request to a designated connection setup block D11.

In response to the request, the designated connection setup block D11 retrieves a reserve relay connection Dd from the relay connection management table D5, performs the processing to set up the connection, and notifies an information transmitting block D8 of the completion of the processing. Upon receipt of the completion notification, the information transmitting block D8 sends completion information, as response information to the switchover request information, to the exchange units A and C.

Information receiving blocks A9 and C9 in the exchange units A and C that received the response information pass the received information to information analyzing blocks A10 and C10. The information analyzing blocks A10 and C10, upon confirming that the received information is the response information, send an automatic switchover request to the relay connection switchover processing blocks A3 and C3.

In response to the above request, the relay connection switchover processing blocks A3 and C3 perform the processing to cut off the relay connections Ac and Cc on the failed line and set up the reserve relay connections Ad and Cd, thus accomplishing connection switchover with connections routed via another adjacent node.

If a communication line failure occurs while the exchange unit D is communicating with the exchange units A and C, the line failure detection block D2 in the exchange unit D notifies the relay connection switchover processing block D3 of the occurrence of the failure. The relay connection switchover processing block D3 then retrieves the relay connection Dd on the failed line from the relay connection management table D5 and, when it is recognized that its backup connection is a connection not passing through the current node, requests the information transmitting block D8 to transmit automatic switchover request information.

Thereupon, the information transmitting block D8 transmits the switchover request information to the exchange units A and C at the remote ends of the communication. The information receiving blocks A9 and C9 that received the information pass the received information to the information analyzing blocks A10 and C10. The information analyzing blocks A10 and C10 analyze the information and send an automatic switchover request to the relay connection switchover processing blocks A3 and C3.

The relay connection switchover processing blocks A3 and C3 retrieve the relay connections on the failed line from the relay connection management tables A5 and B5, perform the processing to cut off the relay connections and set up reserve relay connections, and notify the information transmitting blocks A8 and C8 of the completion of the processing.

The information transmitting blocks A8 and C8 send response information to the exchange unit D. At the exchange unit D, the information receiving block D9 receives the response information and passes it to the information analyzing block D10. The information analyzing block D10 analyzes the information and sends a connection cutoff request to a designated connection cutoff block D12. In response to the request, the designated connection cutoff block D12 performs the processing to cut off the designated reserve connection. In this way, the relay connections routed via other adjacent node can be switched in a synchronized fashion at the respective exchange units, and data loss during communication cutoff can thus be minimized.

Figure 8:
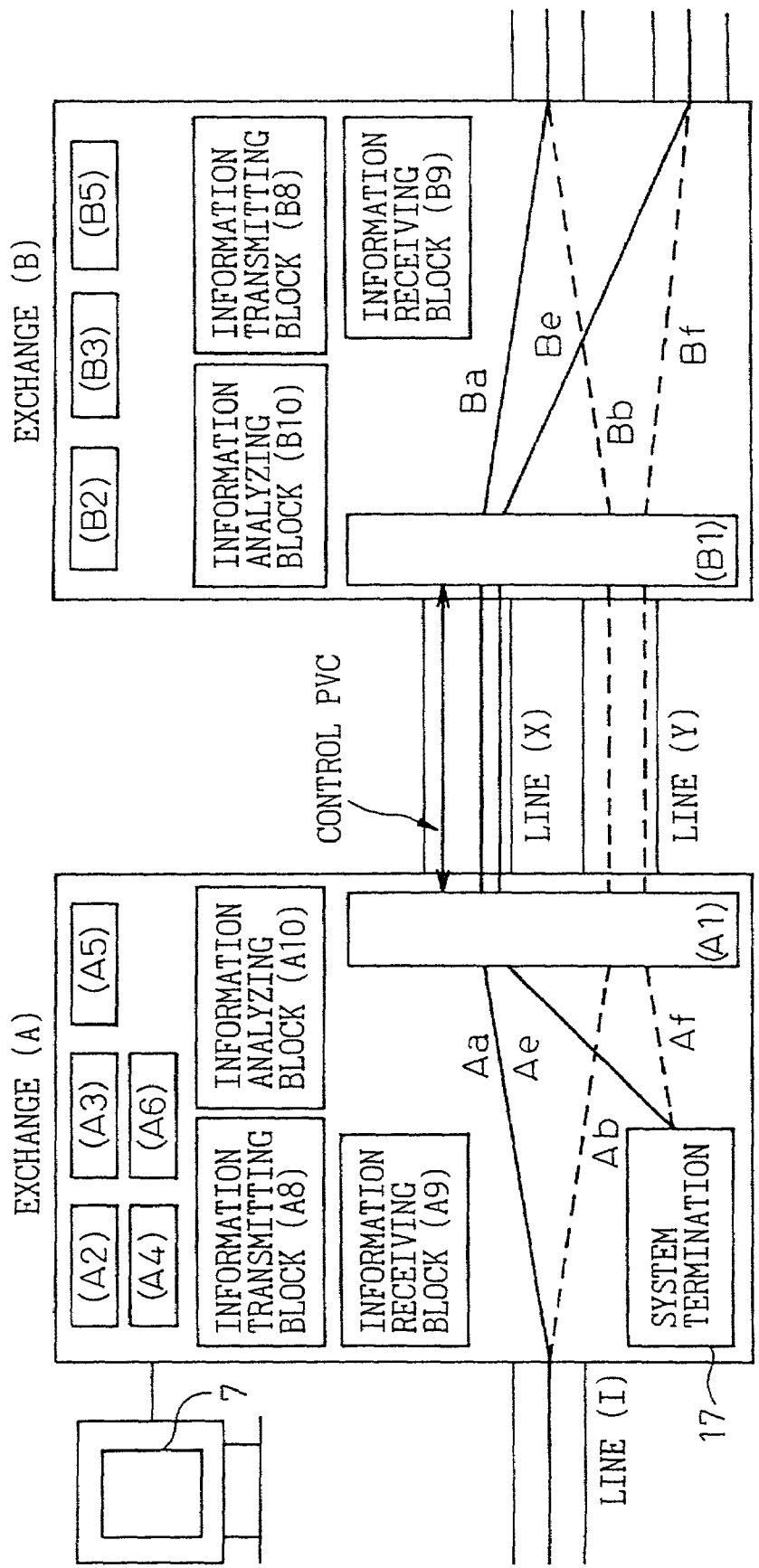
FIG. 8 is a diagram illustrating a manual connection switchover operation.

FIG. 8 is a diagram for explaining the operation performed when the connection switchover described with reference to FIGS. 1 and 3 is performed manually by a command from a maintenance console. The same elements as those in FIGS. 1 and 3 are designated by the same reference characters.

When a manual switchover request is issued from the maintenance console 7 connected to the exchange unit A, the information analyzing block A10 recognizes the manual switchover request and requests the information transmitting block A8 to send out the manual switchover request. The information transmitting block A8 transmits the switchover request information for the connections Aa and Ba to the exchange unit B at the remote end.

The exchange unit B that received the above information at the information receiving block B9 notifies the information analyzing block B10 of the received information. The information analyzing block B10 analyzes the information and, upon recognizing the manual switchover request from the maintenance personnel of the exchange unit A at the remote end, passes the information to the relay connection switchover processing block B3.

The relay connection switchover processing block B3 retrieves the designated relay connections Aa and Ba and their backup relay connections Ab and Bb from the relay connection management table B5, performs the processing to cut off the designated relay connections and set up the backup relay connections, and notifies the information transmitting block B8 of the completion of the processing.

Upon receipt of the notification, the information transmitting block B8 transmits response information, as a response to the switchover request information, to the requesting exchange unit A. At the exchange unit A that received the response information, the information receiving block A9 notifies the information analyzing block A10 which, upon recognizing that the received information is the response information to the switchover request, notifies the relay connection switchover processing block A3 accordingly.

The relay connection switchover processing block A3 retrieves the designated relay connections Aa and Ba and their backup relay connections Ab and Bb from the relay connection management table A5, and performs the processing to cut off the designated relay connections and set up the backup relay connections, to complete the switchover process. In this way, the connections Aa-Ba and Ae-Be between the exchange units A and B can be switched over to the connections Ab-Bb and Af-Bf in a synchronized fashion by just issuing a connection switchover request from the maintenance console 7 connected to the exchange unit A, and the functionality of the exchange unit is thus enhanced.

When the connection to be switched (the primary connection) is a terminating connection terminating in the exchange unit A, the terminating connection switchover processing block A4 retrieves terminating connections Ae and Be from the terminating connection management table A6, and switches them over to reserve connections Af and Bf.

Figure 9:
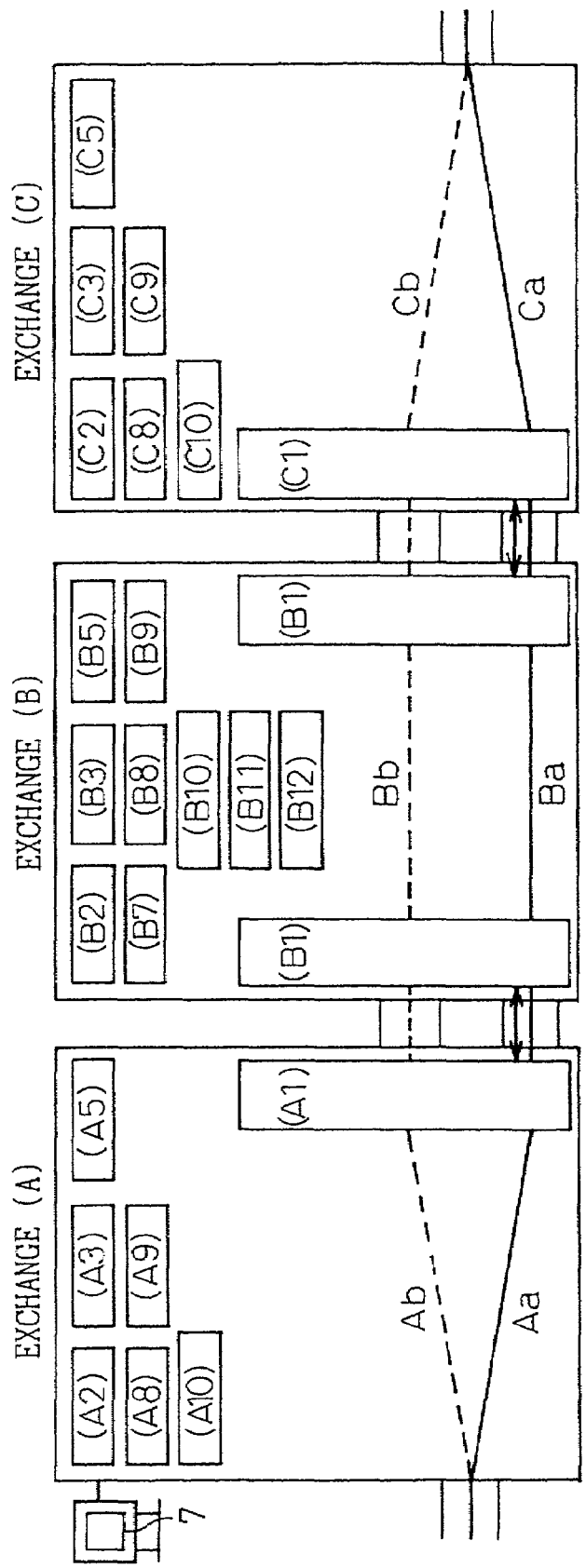
FIG. 9 is a diagram illustrating a manual switchover operation for connections set up between three nodes.

FIG. 9 is a diagram for explaining the operation performed when the connection switchover described with reference to FIG. 6 is performed manually by a command from a maintenance console. The same elements as those in FIG. 8 are designated by the same reference characters. When a manual switchover request is issued from the maintenance console 7 connected to the exchange unit A, the information analyzing block A10 recognizes the manual switchover request and requests the information transmitting block A8 to send out the manual switchover request.

The information transmitting block A8 transmits the manual switchover request information to the exchange unit B at the remote end of the connection. At the exchange unit B, the information analyzing block B10 recognizes the manual switchover request from the maintenance console 7 connected to the exchange unit A, and issues a manual switchover request to the relay connection switchover processing block B3.

Upon recognizing that the relay connection Ba to be switched is a node relay connection by referring to the relay connection management table B5, the relay connection switchover processing block B3 passes the information to the information transmitting block B8. The information transmitting block B8 transmits the switchover request information to the exchange unit C and notifies the information receiving block C9. At the exchange unit C, the information receiving block C9, upon receiving the switchover request, notifies the information analyzing block C10 which then recognizes the manual switchover request and notifies the relay connection switchover processing block C3 accordingly.

The relay connection switchover processing block C3 retrieves the designated relay connection Ca and its backup relay connection Cb from the relay connection management table C5, performs the processing to cut off the designated relay connection and set up the backup relay connection, and notifies the information transmitting block C8 of the completion of the processing. With this notification, the information transmitting block C8 sends response information to the exchange unit B.

Upon receipt of the response information, the information receiving block B9 in the exchange unit B notifies the relay connection switchover processing block B3. The relay connection switchover processing block B3 retrieves the designated relay connection Ba and its backup relay connection Bb from the relay connection management table B5, performs the processing to cut off the designated relay connection and set up the backup relay connection, and notifies the information transmitting block B8 of the completion of the processing.

With this notification, the information transmitting block B8 sends response information to the exchange unit A. The information receiving block A9 in the exchange unit A notifies the information analyzing block A10 of the receipt of the response information. When the information analyzing block A10 recognizes the received information as being the response information to the switchover request, the relay connection switchover processing block A3 is notified accordingly. In response to the notification, the relay connection switchover processing block A3 retrieves the designated relay connection Aa and its backup relay connection Ab from the relay connection management table A5, and performs the processing to cut off the designated relay connection and set up the backup relay connection, to complete the switchover process.

In this way, the connections (Aa-Ba-Ca) between the exchange units A, B, and C can be switched to the connections (Ab-Bb-Cb) in a synchronized fashion by just issuing a connection switchover request from the maintenance console 7 connected to the exchange unit A, and the functionality of the exchange unit is thus enhanced.

As shown in FIGS. 2 and 4, in the line backup system of the present invention, by using the relay connection management tables A5, B5, C5, and D5 and the terminating connection management tables A6, B6, C6, and D6, the attributes (VPI, VCI, QOS, usage bandwidth, etc.) of each backup connection can be managed individually, and each backup connection can be set up with individual attributes (VPI/VCI). Accordingly, even when primary connections belonging to different lines have the same VPI/VCI, if the VPI/VCIs of their backup connections are set to different values, reserve lines for a plurality of lines can be concentrated onto one line. A large number of lines can thus be backed up by one reserve line.

Figure 10:
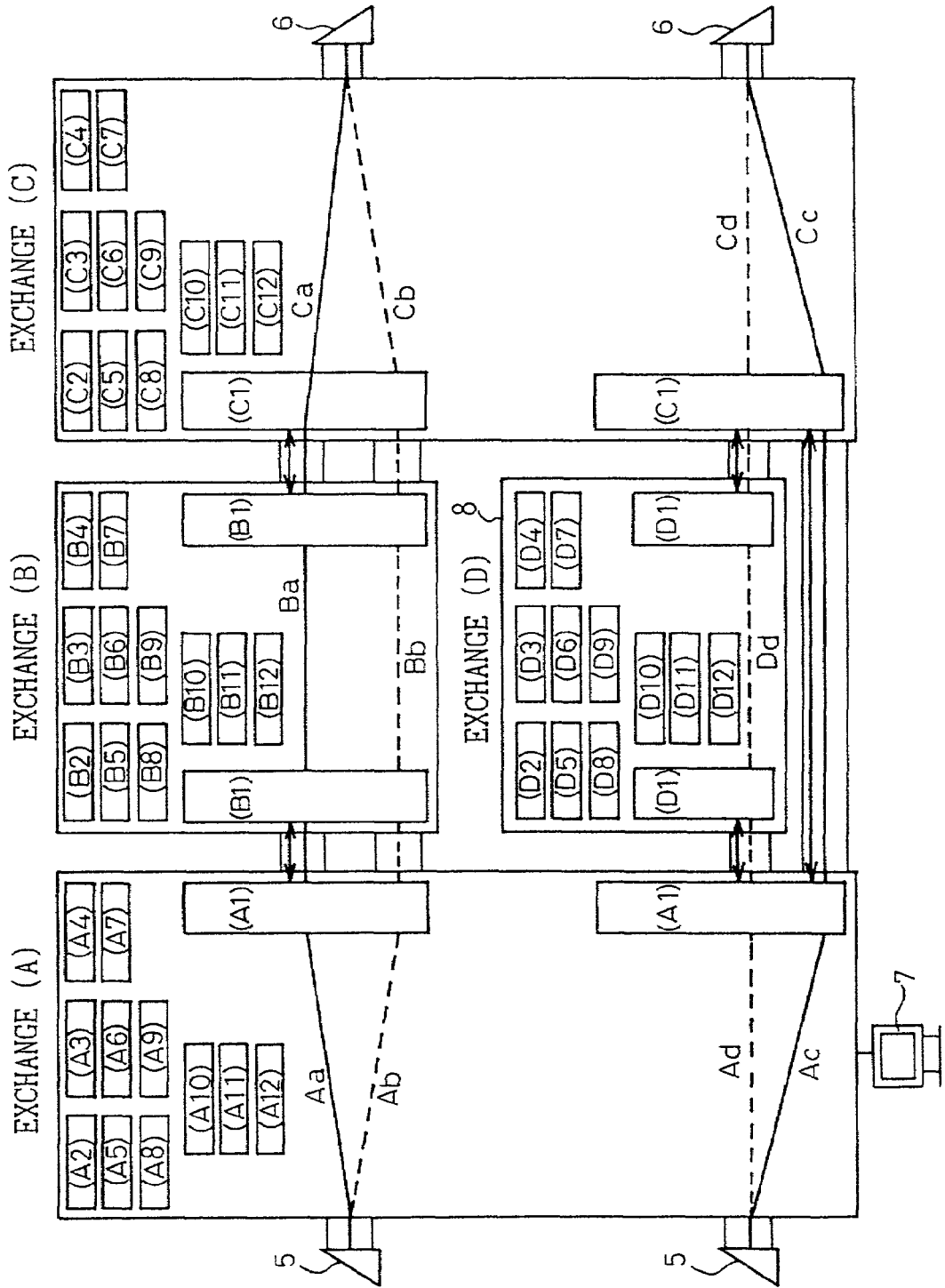
FIG. 10 is a diagram showing one example of the entire configuration of a system constructed by combining the exchange units having the backup facilities according to the present invention.
Figure 12A:
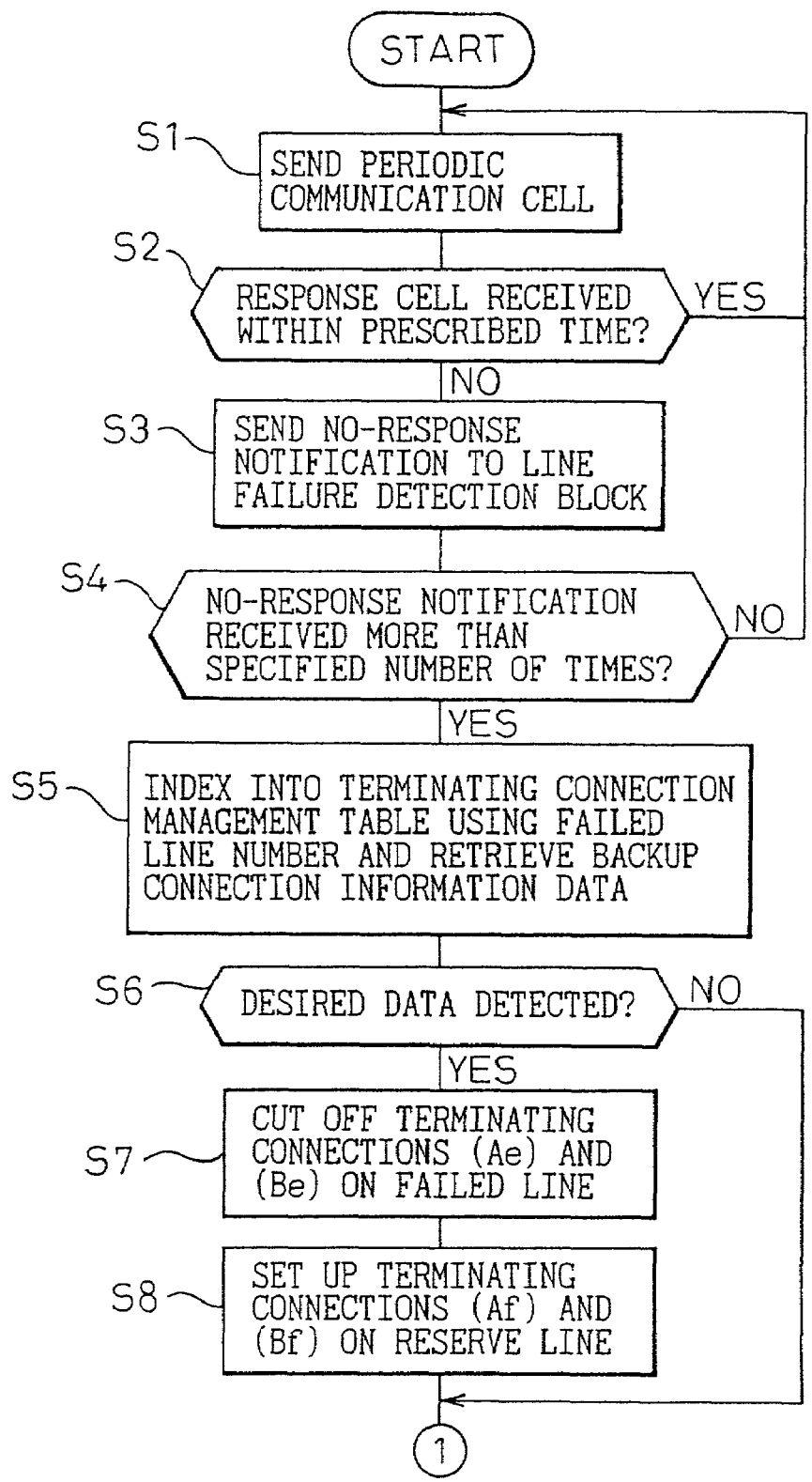
FIGS. 12A and 12B are flowcharts illustrating the operation of the exchange units A and B for accomplishing the automatic switchover shown in FIG. 11.
Figure 12B:
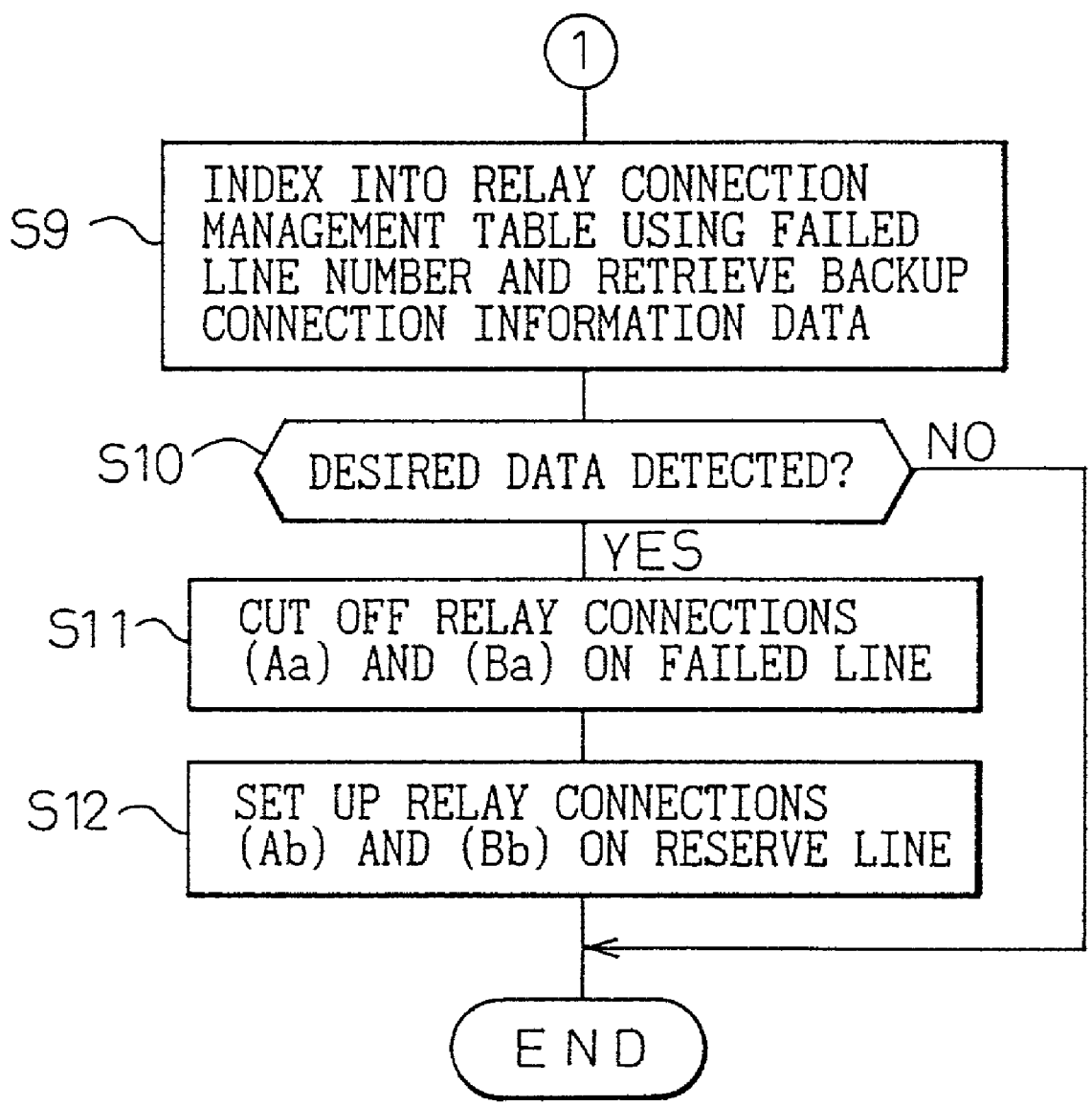

FIG. 10 is a diagram showing one example of the overall configuration of a system constructed by combining the exchange units having the backup facilities so far described according to the present invention. In the figure, the exchange units A, B, C, and D are connected to each other for information communication. Reference numerals 5 and 6 designate communication terminals, and 7 indicates the maintenance console. The constituent elements in the figure are as follows:

A1, B1, C1, D1: Periodic communication processing block
A2, B2, C2, D2: Line failure detection block
A3, B3, C3, D3: Relay connection switchover processing block
A4, B4, C4, D4: Terminating connection switchover processing block
A5, B5, C5, D5: Relay connection management table
A6, B6, C6, D6: Terminating connection management table
A7, B7, C7, D7: Opposite-end line condition analyzing block
A8, B8, C8, D8: Information transmitting block
A9, B9, C9, D9: Information receiving block
A10, B10, C10, D10: Information analyzing block
A11, B11, C11, D11: Designated connection setup block
A12, B12, C12, D12: Designated connection cutoff block
Aa, Ac, Ba, Ca, Cc: Primary connection
Ab, Ad, Bb, Cb, Cd, Dd: Backup connection FIG. 11 is a block diagram for explaining the automatic switchover of connections set up between the exchange units A and B in the system of FIG. 10, and FIGS. 12A and 12B are flowcharts illustrating the switchover operation of FIG. 11. The same elements as those in FIG. 10 are designated by the same reference characters. The system shown in FIG. 11 is an ATM network comprising the exchange units A and B, in which reference numeral 17 designates a system termination provided within the exchange unit A.

In the system shown in FIG. 11, the relay connection management tables A5 and B5 and terminating connection management tables A6 and B6 are set up in advance from the maintenance consoles connected to the respective exchange units, to set a line to be backed up, a reserve line as a backup line, and connections to be backed up on the line.

The periodic communication processing block A1 or B1 in each exchange unit sends a periodic communication cell to the other exchange unit by using a control connection set up between the exchange units, and returns a response cell when a periodic communication cell is received from the other exchange unit. By performing the periodic communication, the communication line with the exchange unit at the remote end is monitored for the occurrence of a failure.

In FIG. 11, if a failure occurs on the line X, rendering the normal periodic communication impossible, the periodic communication processing block A1 or B1 at each exchange unit becomes unable to receive a response cell from the exchange unit at the remote end. If no response cell is received within a prescribed time, the periodic communication processing blocks A1 and B1 send a periodic communication no-response notification to the respective line failure detection blocks A2 and B2.

When the notification is received more than a prescribed number of times from the corresponding periodic communication processing blocks, the line failure detection blocks A2 and B2 determine that a failure has occurred on the communication line and send an automatic switchover request to the respective relay connection switchover processing blocks A3 and B3 and terminating connection switchover processing blocks A4 and B4 to initiate switchover procedures.

The relay connection switchover processing blocks A3 and B3 retrieve the connections Aa and Ba on the failed line from the respective relay connection management tables A5 and B5, and cut off the connections on the failed line. At the same time, the relay connection switchover processing blocks A3 and B3 retrieve the backup line from the management tables and set up the backup connections Ab and Bb on the backup line, thus completing the backup process for the relay connections on the failed line.

The above switchover operation will be described with reference to FIGS. 12A and 12B. The flowchart shown here is common to both exchange units A and B. The following description deals with the operation at the exchange unit A. First, the periodic communication processing block A1 sends out a periodic communication cell to the exchange unit at the remote end by using the control connection connected to the remote unit (S1). In response to the periodic communication cell, a response cell should be returned from the remote unit; therefore, it is checked whether a response cell is received within a prescribed time (S2).

If the response cell is not received within the prescribed time, the periodic communication processing block A1 sends a periodic communication no-response notification to the line failure detection block A2 (S3). The line failure detection block A2 checks whether the notification has been received more than a prescribed number of times from the periodic communication processing block A1 (S4); if the no-response notification has been received more than the prescribed number of times, the line failure detection block A2 determines that a failure has occurred on the communication line, and retrieves backup connection information data by indexing into the terminating connection management table A6 using the failed line number (S5).

If the desired data is retrieved (S6), the terminating connection Ae on the failed line is cut off (S7), and the terminating connection Af on the reserve line is set up (SB). Next, backup connection information data is retrieved by indexing into the relay connection management table A5 using the failed line number (S9). If the desired data is retrieved (S10), the relay connection Aa on the failed line is cut off (S11), and the relay connection Ab on the reserve line is set up (S12).

In this way, according to the present invention, a line failure can be detected on a line-by-line basis by detecting a periodic communication off condition, and all affected connections can be automatically switched to the reserve line.

FIG. 13 is a block diagram for explaining the manual switchover of connections set up between the exchange units A and B, and FIGS. 14A, 14B, 15A and 15B are flowcharts illustrating the switchover operation. In FIG. 13, the same elements as those in FIG. 11 are designated by the same reference characters.

The relay connection management tables A5 and B5 and terminating connection management tables A6 and B6 are set up in advance from the maintenance consoles connected to the respective exchange units, to set a line to be backed up, a reserve line as an backup line, and connections to be backed up on the line.

When a communication line switchover request is issued from the maintenance console MCa at the exchange unit A, the information analyzing block A10 recognizes the request as being a manual switchover request from the maintenance console MCa, then requests the information transmitting block A8 to prepare the manual switchover request information and transmit the information to the exchange unit B at the remote end of the communication, and waits for a processing completion notification from the exchange unit B.

At the exchange unit B, when the above information is received at the information receiving block B9, the information is transferred to the information analyzing block B10. The information analyzing block B10 recognizes the manual switchover request information, and notifies the relay connection switchover processing block B3 and terminating connection switchover processing block B4 accordingly. The switchover processing blocks B3 and B4 retrieve the connections Ba and Be set up on the designated line and also the backup line from the relay connection management table B5 and terminating connection management table B6, and perform the processing to cut off the connections Ba and Be and set up the reserve connections Bb and Bf in accordance with the switchover request information.

Upon completion of the processing, the switchover processing blocks instruct the information transmitting block B8 to send a processing completion notification to the exchange unit A. At the exchange unit A, when the completion notification is received at the information receiving block A9, the switchover process is resumed; that is, the relay connection Aa and terminating connection Ae set up on the designated line and also the backup line are retrieved from the relay connection management table A5 and terminating connection management table A6, and the processing is performed to cut off the connections Aa and Ae on the designated line and set up the reserve connections Ab and Af on the backup line, thus completing the switchover operation of the communication line in accordance with the request from the maintenance console.

Figure 14A:
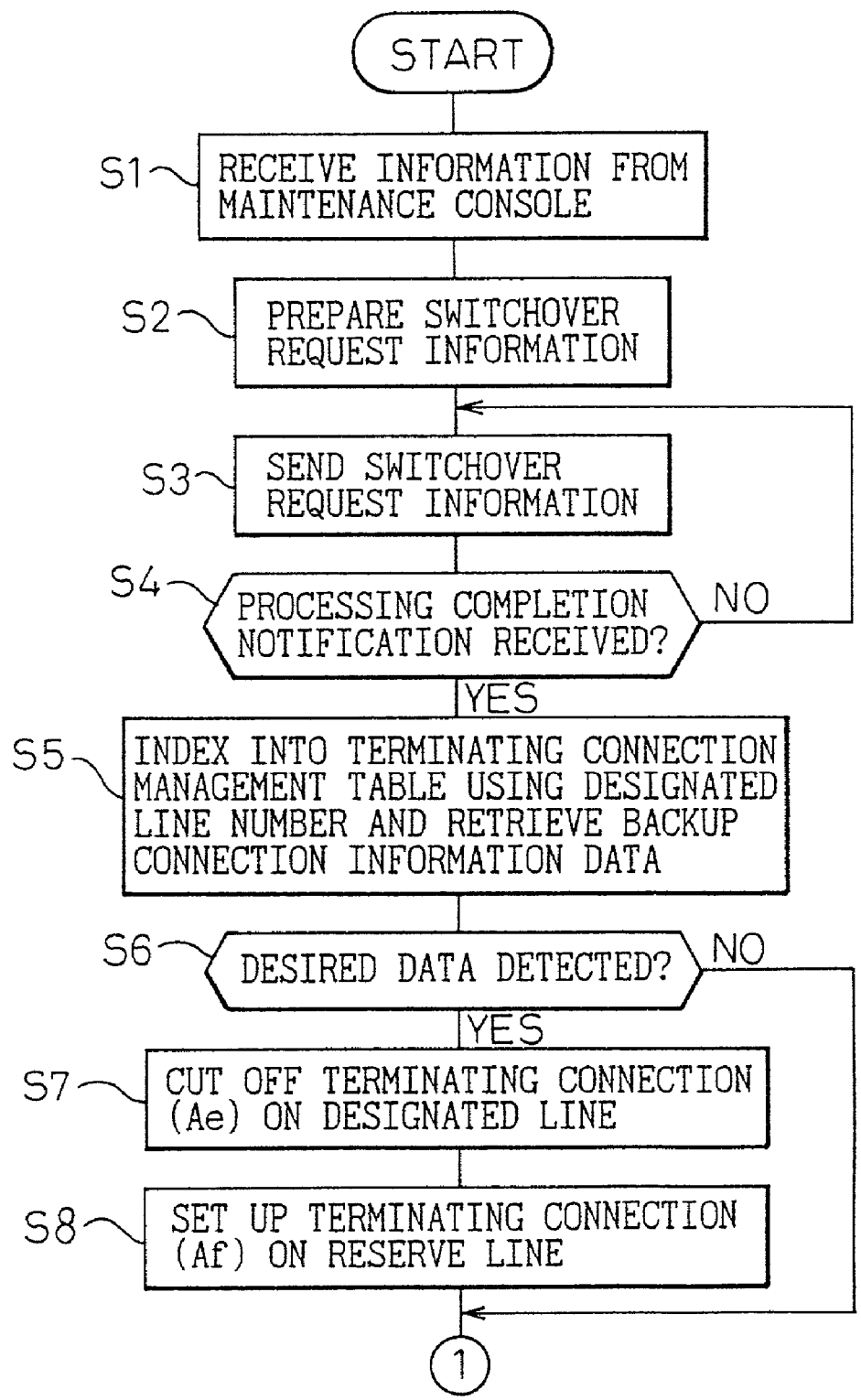
FIGS. 14A and 14B are flowcharts illustrating the operation of the exchange unit A for accomplishing the manual switchover shown in FIG. 13.
Figure 14B:
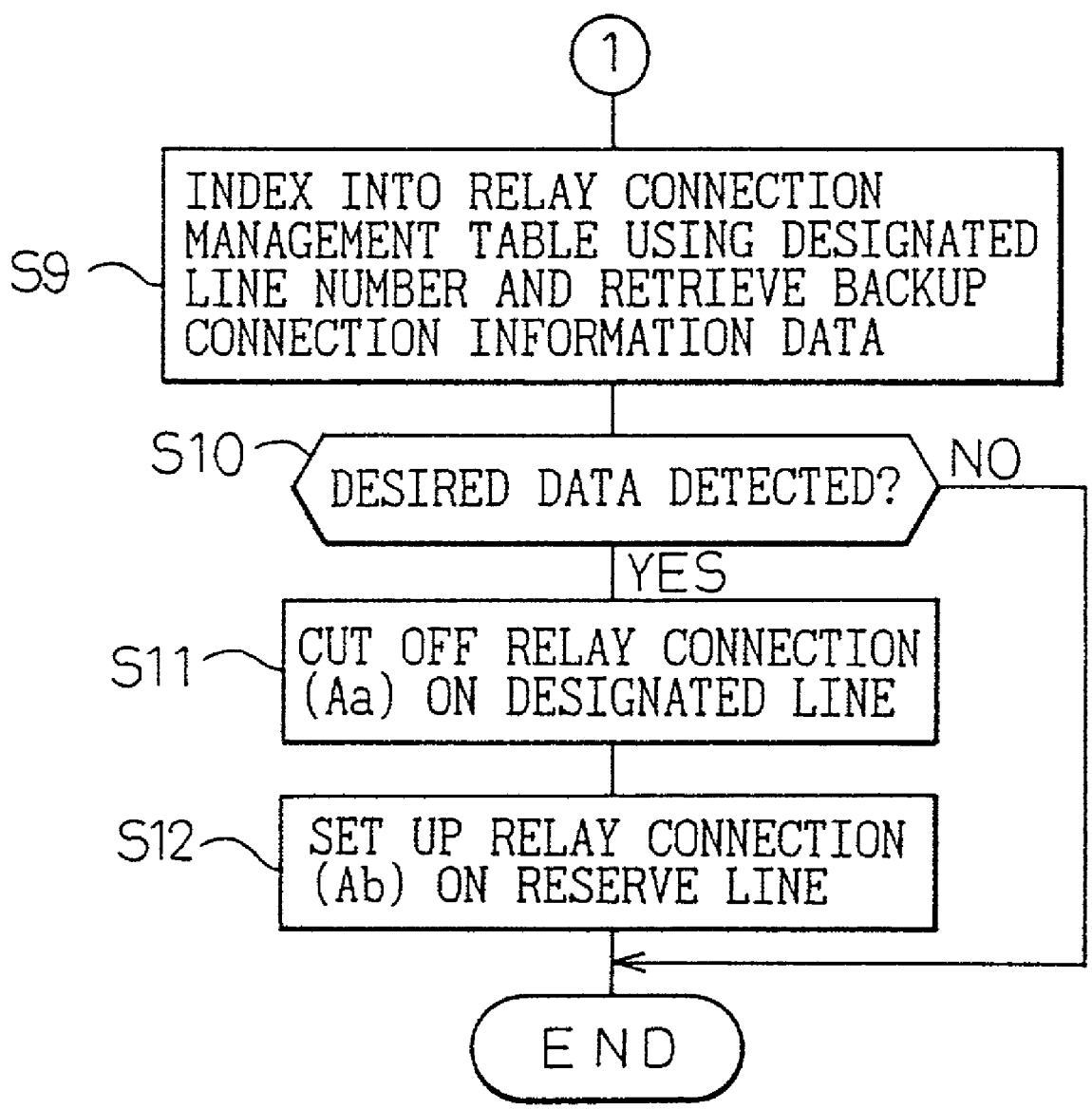

FIGS. 14A and 14B are flowcharts illustrating the operation of the exchange unit A. First, when the operator enters a switchover request from the maintenance console MCa, information relating to the request is received (S1). Then, the information analyzing block A10 recognizes the information as being a manual switchover request from the maintenance console, and prepares the manual switchover request information for transmission to the exchange unit B at the remote end of the communication (S2), and the information transmitting block A8 transmits the switchover request information to the exchange unit B (S3).

The exchange unit A checks whether a processing completion notification has been received from the exchange unit B at the remote end (S4). When the processing completion notification is received at the information receiving block A9, the switchover process is resumed. First, backup connection information data is retrieved by indexing into the terminating connection management table A6 using the designated line number (S5). When the data is detected (S6), the terminating connection Ae on the designated line is cut off (S7), and the terminating connection Af on the reserve line is set up (S8).

Next, backup connection information data is retrieved by indexing into the relay connection management table A5 using the designated line number (S9). If the desired data is detected (S10), the relay connection Aa on the designated line is cut off (S11), and the relay connection Ab on the reserve line is set up (S12).

Figure 15A:
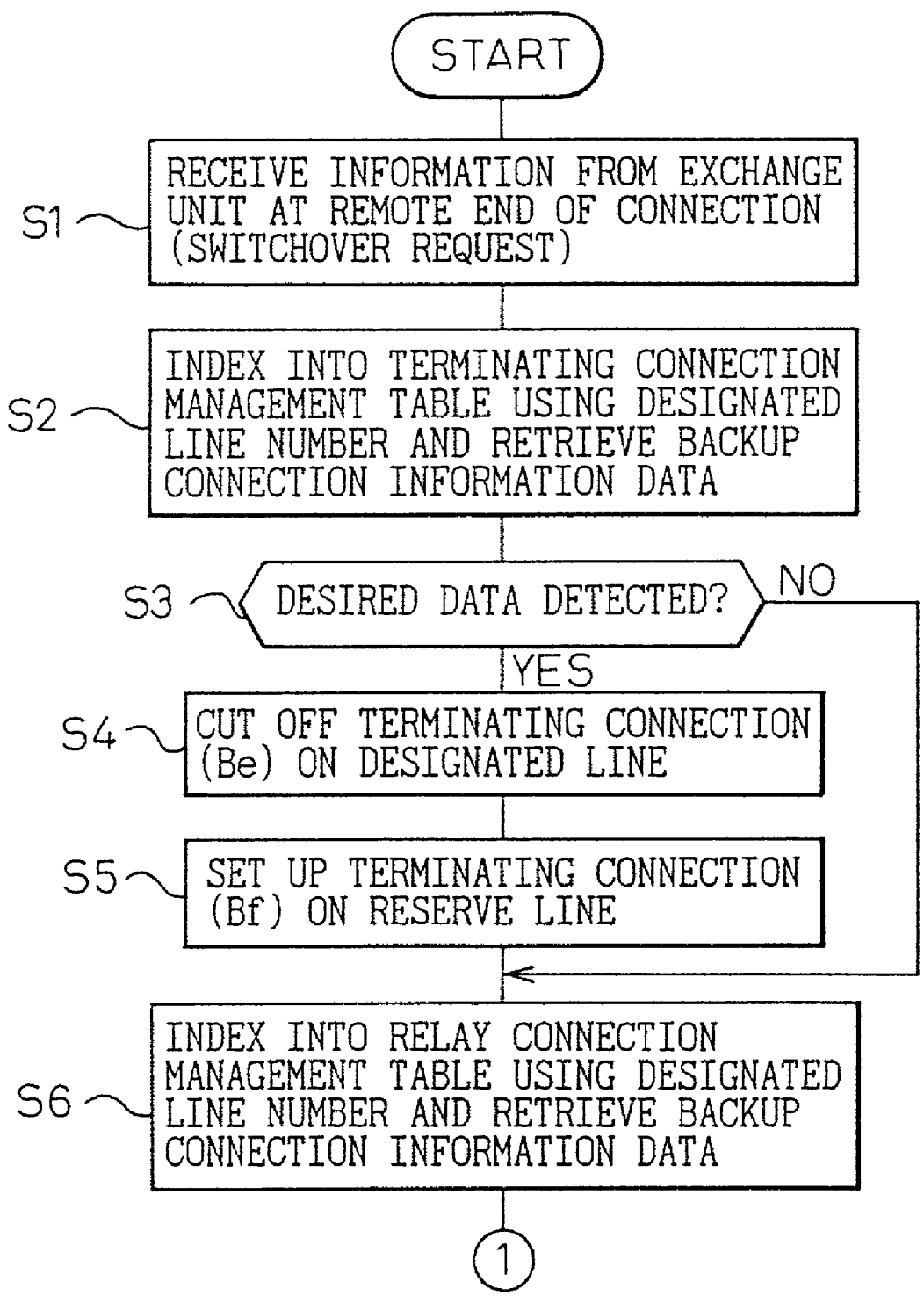
FIGS. 15A and 15B are flowcharts illustrating the operation of the exchange unit B for accomplishing the manual switchover shown in FIG. 13.
Figure 15B:
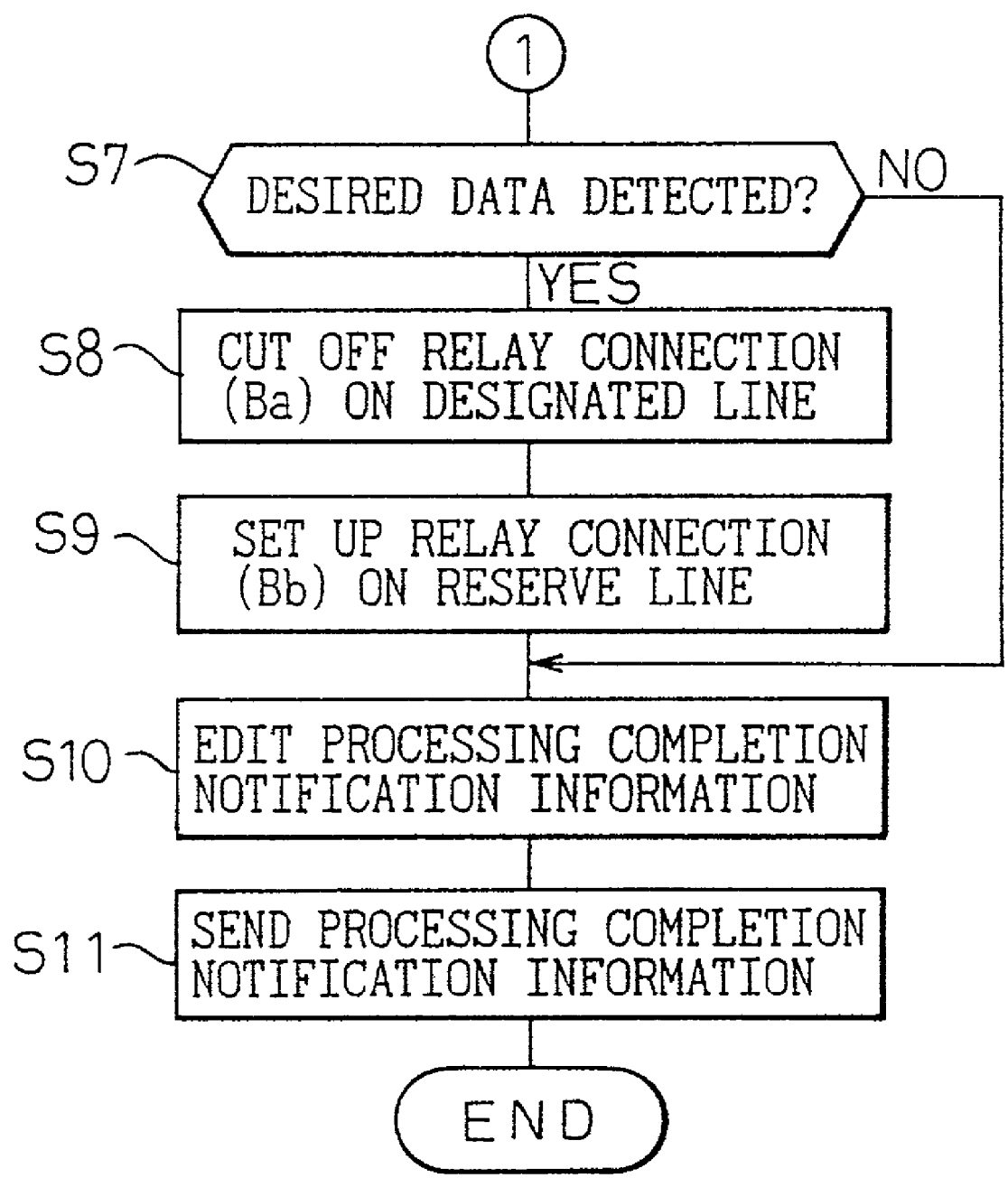

Next, the operation at the exchange unit B will be described with reference to FIGS. 15A and 15B. When the information receiving block B9 in the exchange unit B receives the switchover request information from the exchange unit A at the remote end of the connection (S1), the exchange unit B retrieves backup connection information data by indexing into the terminating connection management table B6 using the designated line number (S2). If the desired data is detected (S3), the terminating connection Be on the designated line is cut off (S4), and the terminating connection Bf on the reserve line is set up (S5).

Next, backup connection information data is retrieved by indexing into the relay connection management table B5 using the designated line number (S6). If the desired data is detected (S7), the relay connection Ba on the designated line is cut off (S8), and the relay connection Bb on the reserve line is set up (S9). Then, the processing completion notification information is edited (S10), and the processing completion notification information is sent from the information transmitting block B8 to the exchange unit A (S11).

In this way, according to the present invention, switchover from a designated connection to another designated connection can be carried out, and thus a connection within the exchange unit at the remote end and a connection within the exchange unit at the requesting end can be switched in a synchronized fashion by a request from the maintenance personnel.

Figure 17A:
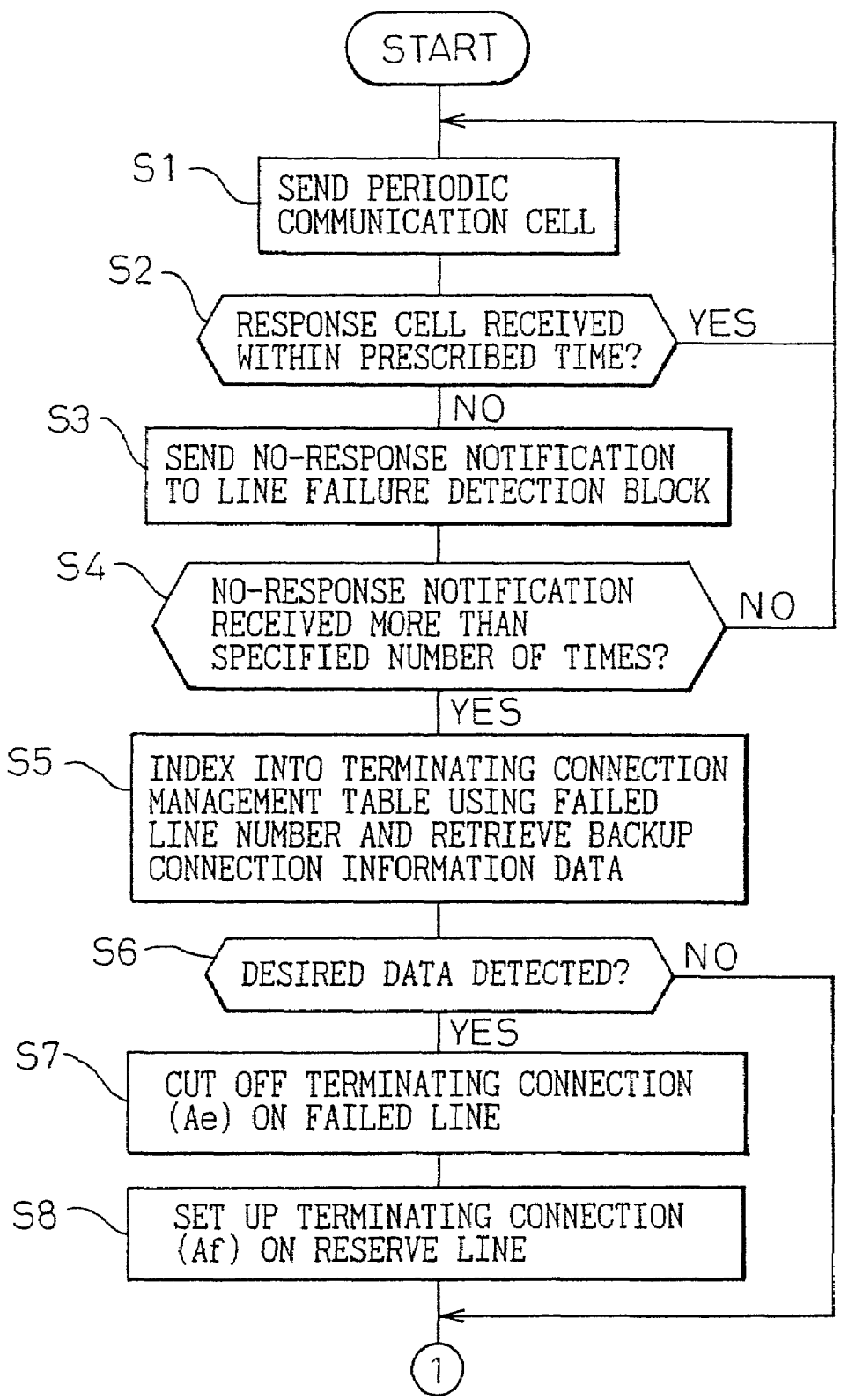
FIGS. 17A and 17B are flowcharts illustrating the operation of the exchange units A and C for accomplishing the automatic switchover shown in FIG. 16.
Figure 17B:
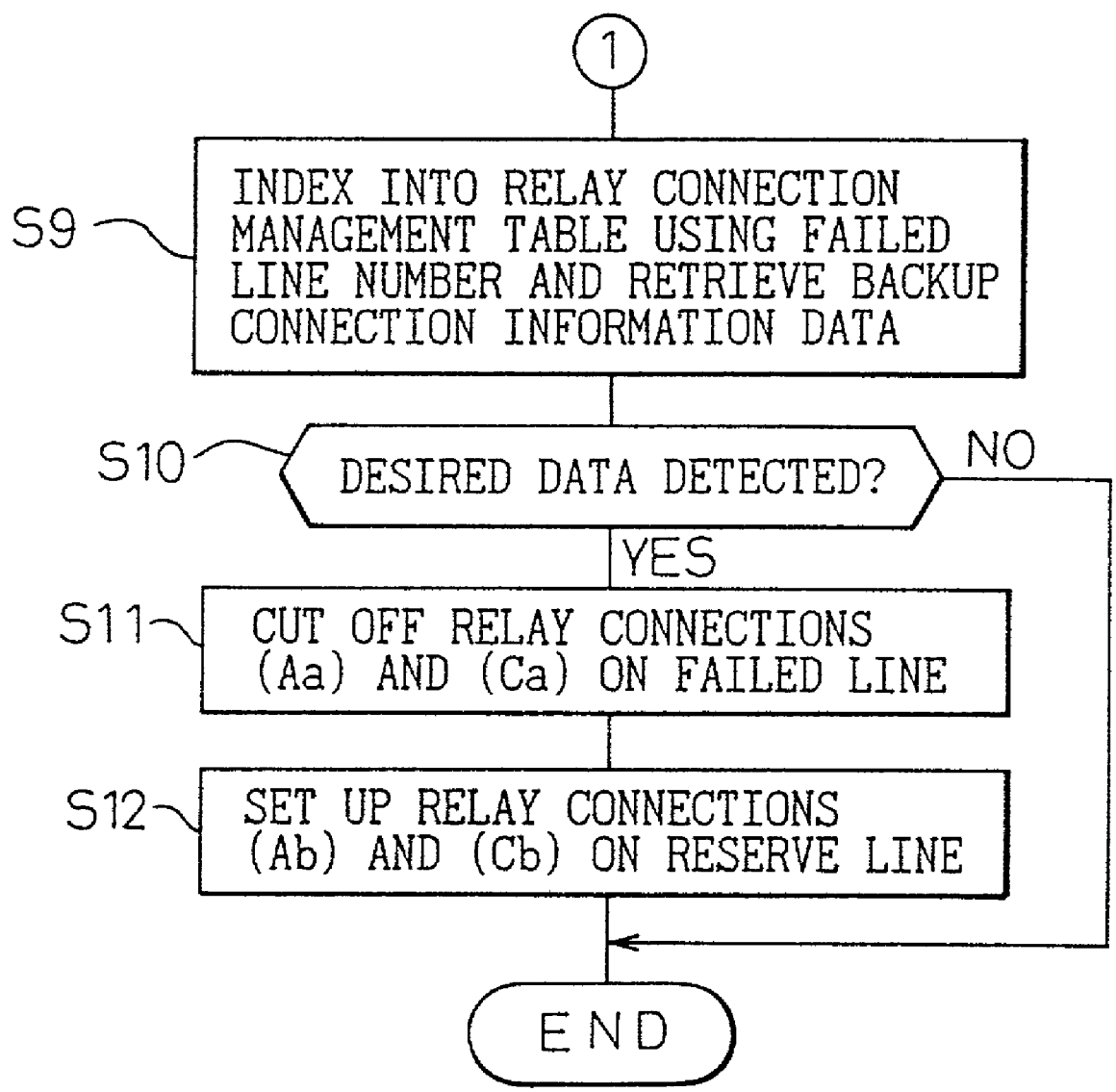
Figure 18A:
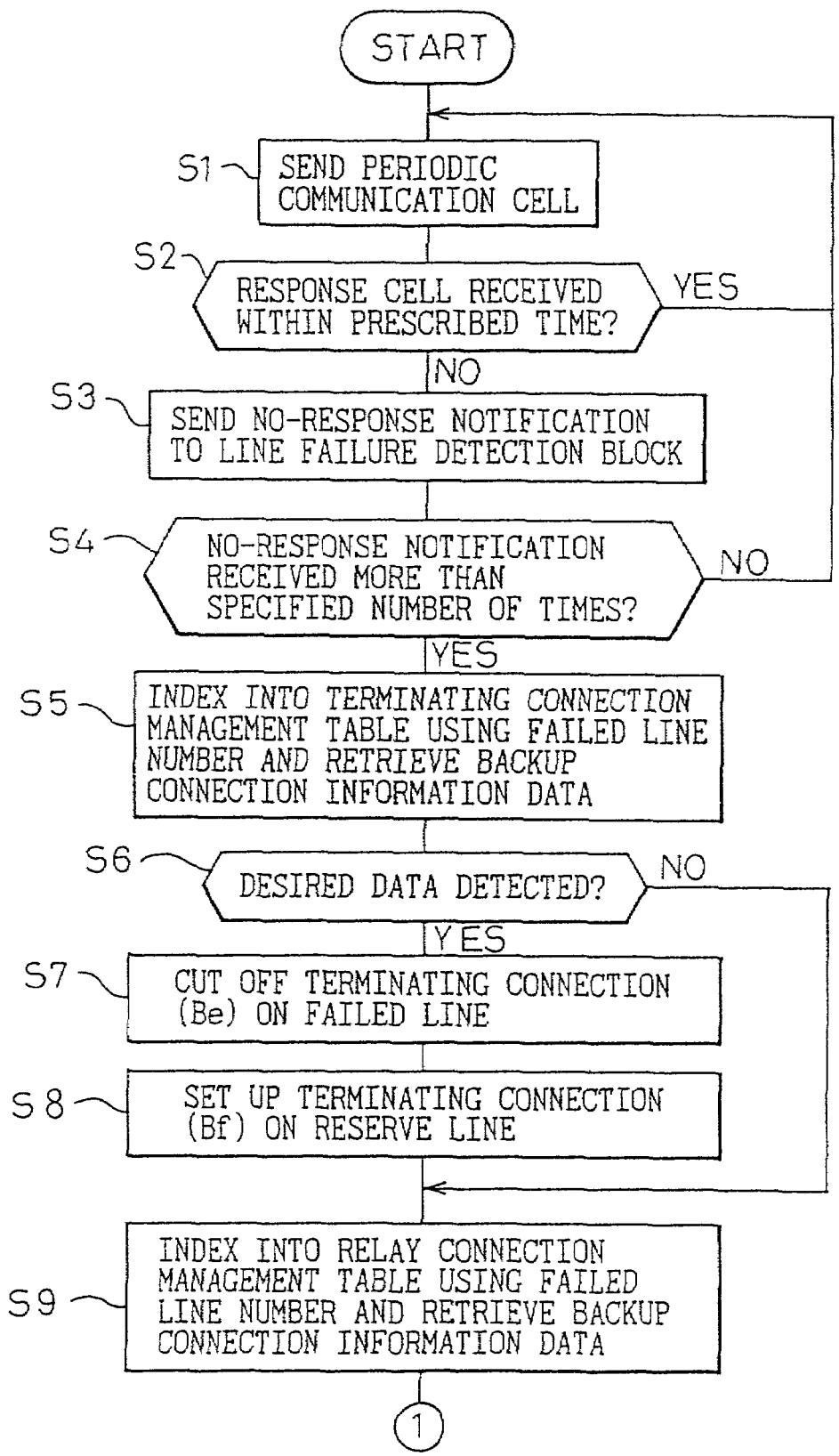
FIGS. 18A and 18B are flowcharts illustrating the operation of the exchange unit B for accomplishing the automatic switchover shown in FIG. 16.
Figure 18B:
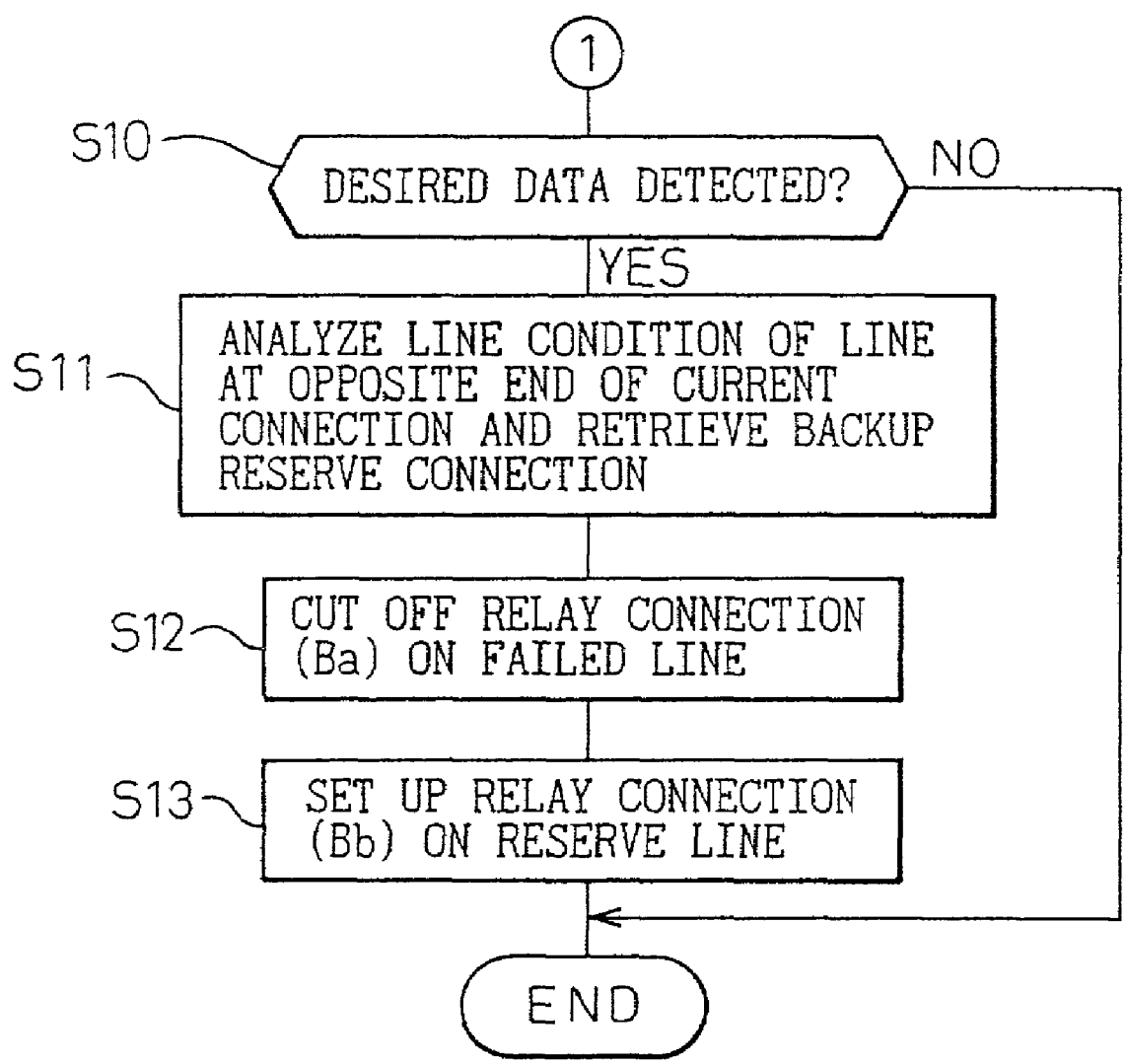
Figure 19:
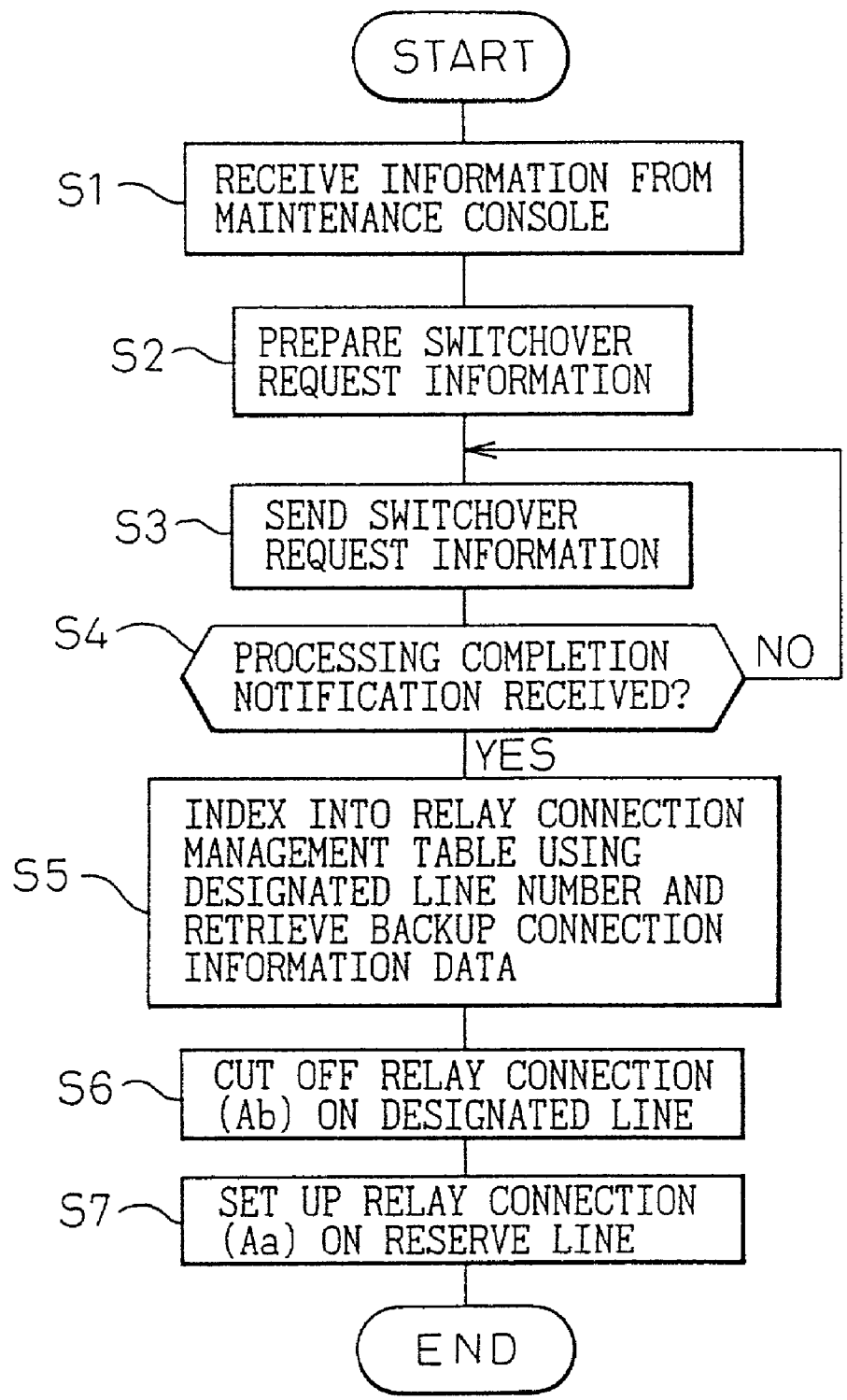
FIG. 19 is a flowchart illustrating the operation of the exchange unit A for accomplishing the manual switchover shown in FIG. 16.
Figure 20:
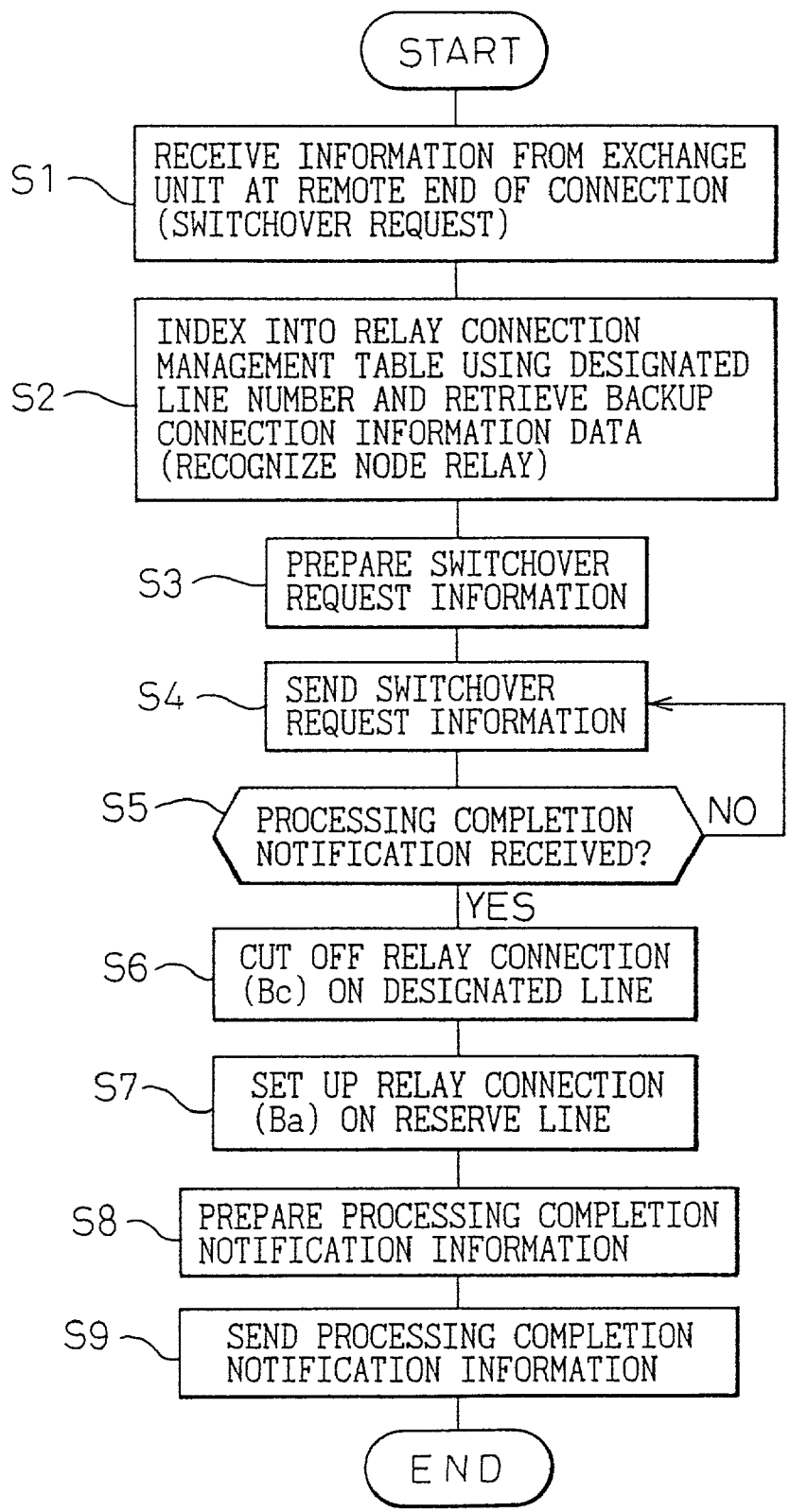
FIG. 20 is a flowchart illustrating the operation of the exchange unit B for accomplishing the manual switchover.
Figure 21:
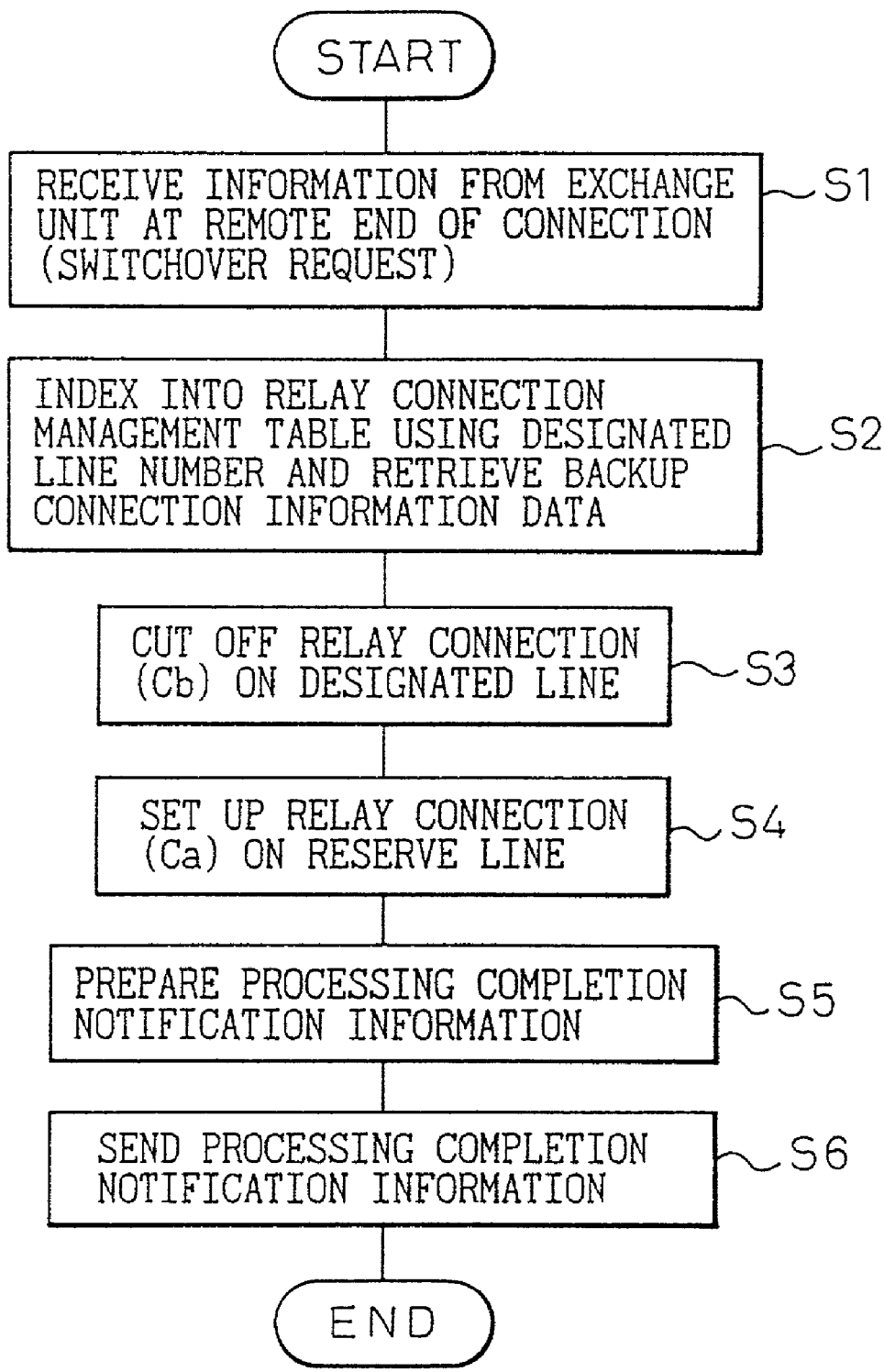
FIG. 21 is a flowchart illustrating the operation of the exchange unit C for accomplishing the manual switchover.

FIG. 16 is a block diagram for explaining the automatic switchover and manual switchover operations for connections set up between the exchange units A, B, and C in the system of FIG. 10, FIGS. 17A and 17B are flowcharts illustrating the automatic switchover operation at the exchange units A and C, FIGS. 18A and 18B are flowcharts illustrating the automatic switchover operation at the exchange unit B, FIG. 19 is a flowchart illustrating the manual switchover operation at the exchange unit A, FIG. 20 is a flowchart illustrating the manual switchover operation at the exchange unit B, and FIG. 21 is a flowchart illustrating the manual switchover operation at the exchange unit C. In FIG. 16, the same elements as those in FIG. 13 are designated by the same reference characters.

In the system shown in FIG. 16, a line to be backed up, a reserve line as an backup line, and connections to be backed up on the line are set in advance from the maintenance console connected to each exchange unit.

The communication path between the communication terminals 5 and 6 is routed via Aa-Ba-Ca, and reserve lines Y and YY are set to back up the lines X and XX at both ends of the relay connection Ba so that the communication can continue uninterrupted even if a line failure occurs on any of the lines X, Y, XX, and YY.

If a line failure occurs on the line X while the communication terminals 5 and 6 are communicating via the normal communication path Aa-Ba-Ca, the exchange units A and B switch the affected relay connections to the reserve line; in this case, the relay connection switchover processing block B3 recognizes that a reserve line is also provided at the opposite end of the relay connection when retrieving the relay connection from the relay connection management table B5, and queries the opposite-end line condition analyzing block B7 about the condition of the opposite-end line XX, and after recognizing that the line XX is operating normally, the relay connection switchover processing block B3 sets up the reserve connection Bb on the reserve line to enable the communication terminals 5 and 6 to continue the communication.

Next, if a line failure occurs on the line XX, the exchange units B and C switch the affected relay connections to the reserve line; in this case also, the relay connection switchover processing block B3 queries the opposite-end line condition analyzing block B7 about the condition of the opposite-end line X when retrieving the relay connection from the relay connection management table B5.

At this time, the opposite-end line condition analyzing block B7 recognizes that the reserve line Y has been switched into service to replace the failed line X, and sets up the relay connection Bc on the reserve line to enable the communication terminals 5 and 6 to continue the communication.

In this way, according to the present invention, connections connecting between three or more nodes can be backed up by analyzing the condition of the opposite-end line and selecting operable reserve connections from among the reserve connections.

When a switchover request is issued from the maintenance console at the exchange unit A to switch the communication line to the normal communication path Aa-Ba-Ca while the communication terminals 5 and 6 are communicating via the communication path Ab-Bc-Cb on the reserve line, the information transmitting block A8 is instructed to prepare the switchover request information and transmit the information to the exchange unit B at the remote end; then, the exchange unit A waits for a processing completion notification from the exchange unit B.

At the exchange unit B, after the switchover request information is received at the information receiving block B9, the information analyzing block B10 analyzes the information, recognizes the request as being a switchover request which should also be passed on to the exchange unit C, and requests the information transmitting block B8 to prepare the switchover request information and transmit the information to the exchange unit C; then, the exchange unit B waits for a processing completion notification from the exchange unit C.

At the exchange unit C, after the switchover request information is received at the information receiving block C9, the information analyzing block C10 analyzes the information, and issues a switchover request to the relay connection switchover processing block C3. When the switchover processing at the exchange unit C is completed, the information transmitting block C8 transmits a processing completion notification to the exchange unit B.

Upon receiving the processing completion notification from the exchange unit C, the exchange unit B resumes the switchover operation to carry out the switchover, and a processing completion notification is transmitted from the information transmitting block B8 to the exchange unit A. Upon receiving the processing completion notification from the exchange unit B, the exchange unit A resumes the switchover operation and cuts off the line, to complete the processing of the switchover request from the maintenance console 7.

In this way, according to the present invention, switchover for designated connections at the exchange units A to C can be accomplished, and connections connecting between three or more nodes (exchange units) can be switched in a synchronized fashion by a request from the maintenance personnel.

FIGS. 17A and 17B are flowcharts illustrating the operation of the exchange units A and C for the automatic switchover of connections set up between the exchange units A, B, and C. The operation will be described by taking the exchange unit A as an example. First, the periodic communication processing block A1 sends out a periodic communication cell to the exchange unit at the remote end by using the control connection connected to the remote unit (S1). In response to the periodic communication cell, a response cell should be returned from the remote unit; therefore, it is checked whether a response cell is received within a prescribed time (S2).

If no response cell is received within the prescribed time, the periodic communication processing block A1 sends a periodic communication no-response notification to the line failure detection block A2 (S3). The line failure detection block A2 checks whether the notification has been received more than a prescribed number of times from the periodic communication processing block A1 (S4); if the no-response notification has been received more than the prescribed number of times, the line failure detection block A2 determines that a failure has occurred on the communication line, and retrieves backup connection information data by indexing into the terminating connection management table A6 using the failed line number (S5).

If the desired data is retrieved (S6), the terminating connection Ae on the failed line is cut off (S7), and the terminating connection Af on the reserve line is set up (S8). Next, backup connection information data is retrieved by indexing into the relay connection management table A5 using the failed line number (S9). If the desired data is retrieved (S10), the relay connection Aa on the failed line is cut off (S11), and the relay connection Ab on the reserve line is set up (S12).

FIGS. 18A and 18B are flowcharts illustrating the operation of the exchange unit B for the automatic switchover of connections set up between the exchange units A, B, and C. First, the periodic communication processing block B1 sends out a periodic communication cell to the exchange unit at the remote end by using the control connection connected to the remote unit (S1). In response to the periodic communication cell, a response cell should be returned from the remote unit; therefore, it is checked whether a response cell is received within a prescribed time (S2).

If no response cell is received within the prescribed time, the periodic communication processing block B1 sends a periodic communication no-response notification to the line failure detection block B2 (S3). The line failure detection block B2 checks whether the notification has been received more than a prescribed number of times from the periodic communication processing block B1 (S4); if the no-response notification has been received more than the prescribed number of times, the line failure detection block B2 determines that a failure has occurred on the communication line, and retrieves backup connection information data by indexing into the terminating connection management table B6 using the failed line number (S5).

If the desired data is retrieved (S6), the terminating connection Be on the failed line is cut off (S7), and the terminating connection Bf on the reserve line is set up (S8). Next, backup connection information data is retrieved by indexing into the relay connection management table B5 using the failed line number (S9). If the desired data is retrieved (S10), the line condition of the line at the opposite end of the current connection is analyzed, and the backup connection is retrieved (S11). After that, the relay connection Ba on the failed line is cut off (S12), and the relay connection Bb on the reserve line is set up (S13).

FIG. 19 is a flowchart illustrating the operation of the exchange unit A for the manual switchover of connections set up between the exchange units A, B, and C. When the maintenance personnel enters a switchover request from the maintenance console 7, the information receiving block A9 receives information relating to the request (S1). Then, the information analyzing block A10 prepares the received information (S2), and the information transmitting block A8 transmits the information toward the communication terminal 6 at the exchange unit C (S3).

Next, it is checked whether the information receiving block A9 has received a processing completion notification from the exchange unit at the remote end (S4). When the completion notification is received, backup connection information data is retrieved by indexing into the relay connection management table A5 using the designated line number (S5). Then, the relay connection Ab on the designated line is cut off (S6), and the relay connection Aa on the reserve line is set up (S7).

FIG. 20 is a flowchart illustrating the operation of the exchange unit B for the manual switchover of connections set up between the exchange units A, B, and C. When the information receiving block B9 in the exchange unit B receives the switchover request signal from the exchange unit A at the remote end of the connection (S1), backup connection information data is retrieved by indexing into the relay connection management table B5 using the designated line number (S2). The information analyzing block B10 prepares the switchover request information (S3), and the information transmitting block B8 sends out the switchover request information (S4).

After that, the exchange unit B checks whether a processing completion notification has been received from the exchange unit at the remote end (S5). When the completion notification is received, the relay connection Bc on the designated line is cut off (S6), and the relay connection Ba on the reserve line is set up (S7). After that, the information analyzing block B10 prepares the processing completion notification information (S8), and the information transmitting block B8 transmits the processing completion notification information to the exchange unit A (S9).

FIG. 21 is a flowchart illustrating the operation of the exchange unit C for the manual switchover of connections set up between the exchange units A, B, and C. When the information receiving block C9 receives the switchover request signal from the exchange unit B at the remote end of the connection (S1), backup connection information data is retrieved by indexing into the relay connection management table C5 using the designated line number (S2). Next, the relay connection Cb on the designated line is cut off (S3), and the relay connection Ca on the reserve line is set up (S4). After that, the information analyzing block C10 prepares the processing completion notification information (S5), and the information transmitting block C8 transmits the processing completion notification information to the exchange unit B (S6).

Figure 22:
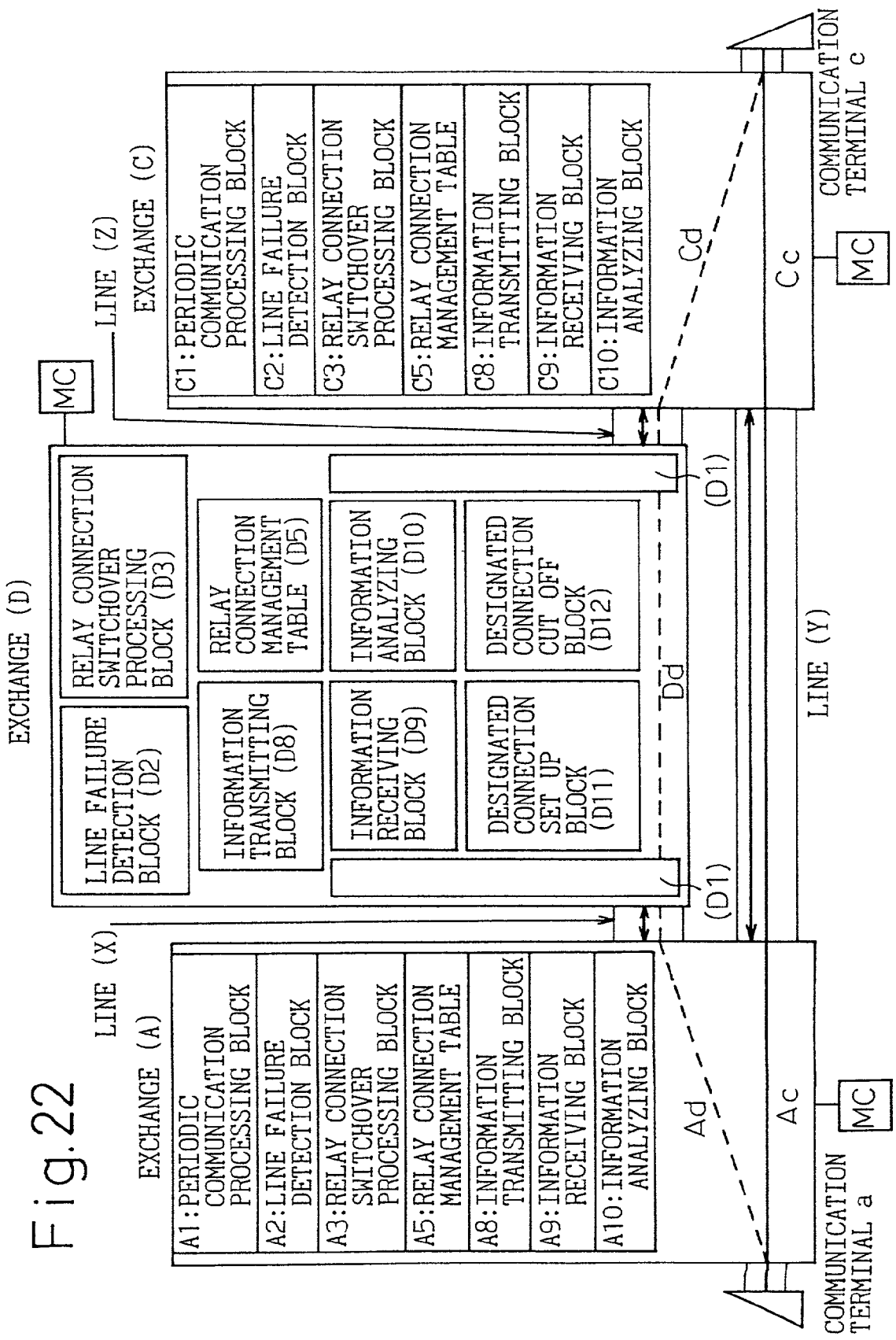
FIG. 22 is a diagram illustrating automatic switchover from a connection between the exchange units A and C to a connection passing through an exchange unit D.
Figure 23:
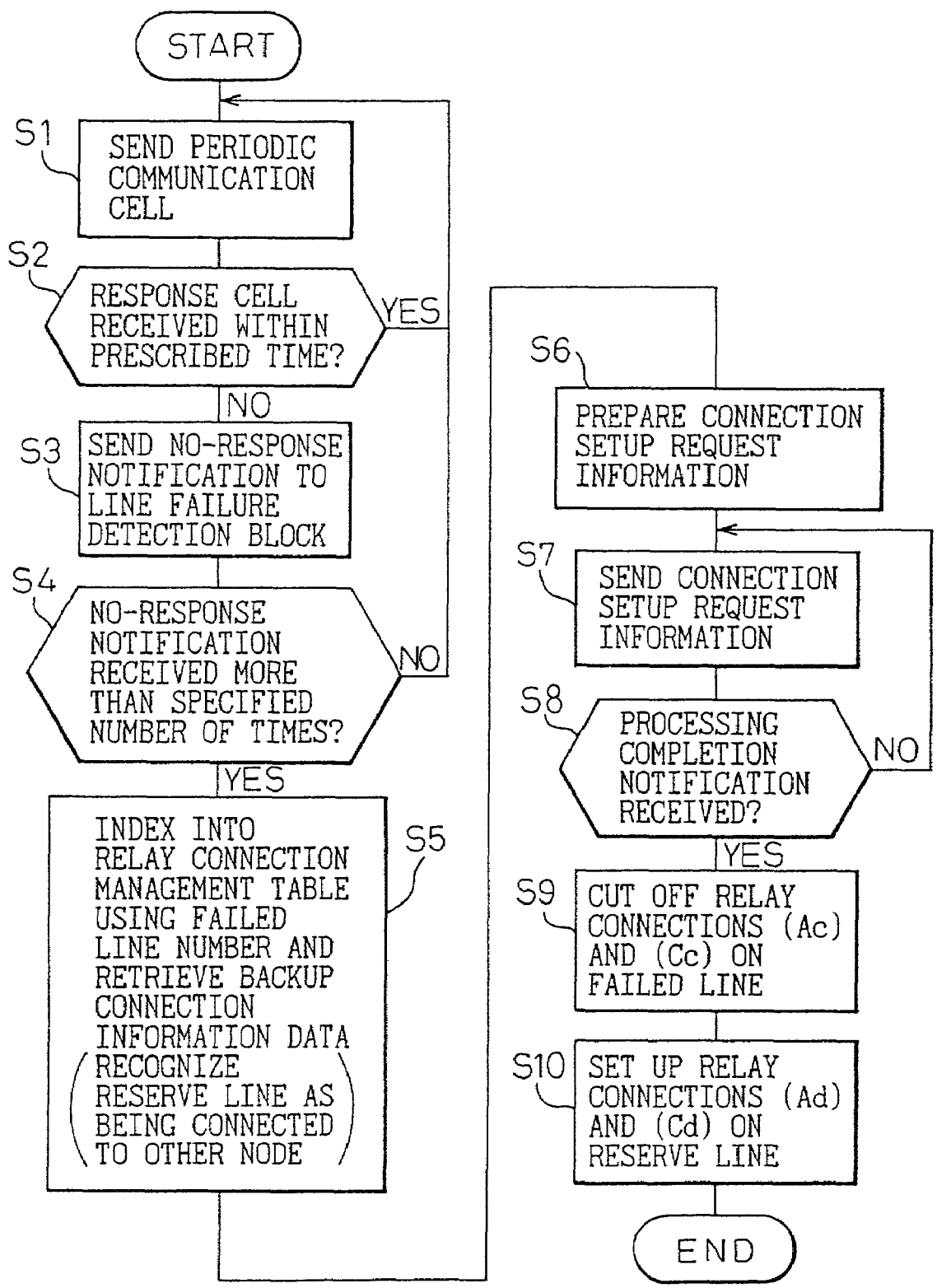
FIG. 23 is a flowchart illustrating the operation of the exchange units A and C for accomplishing the automatic switchover shown in FIG. 22.
Figure 24:
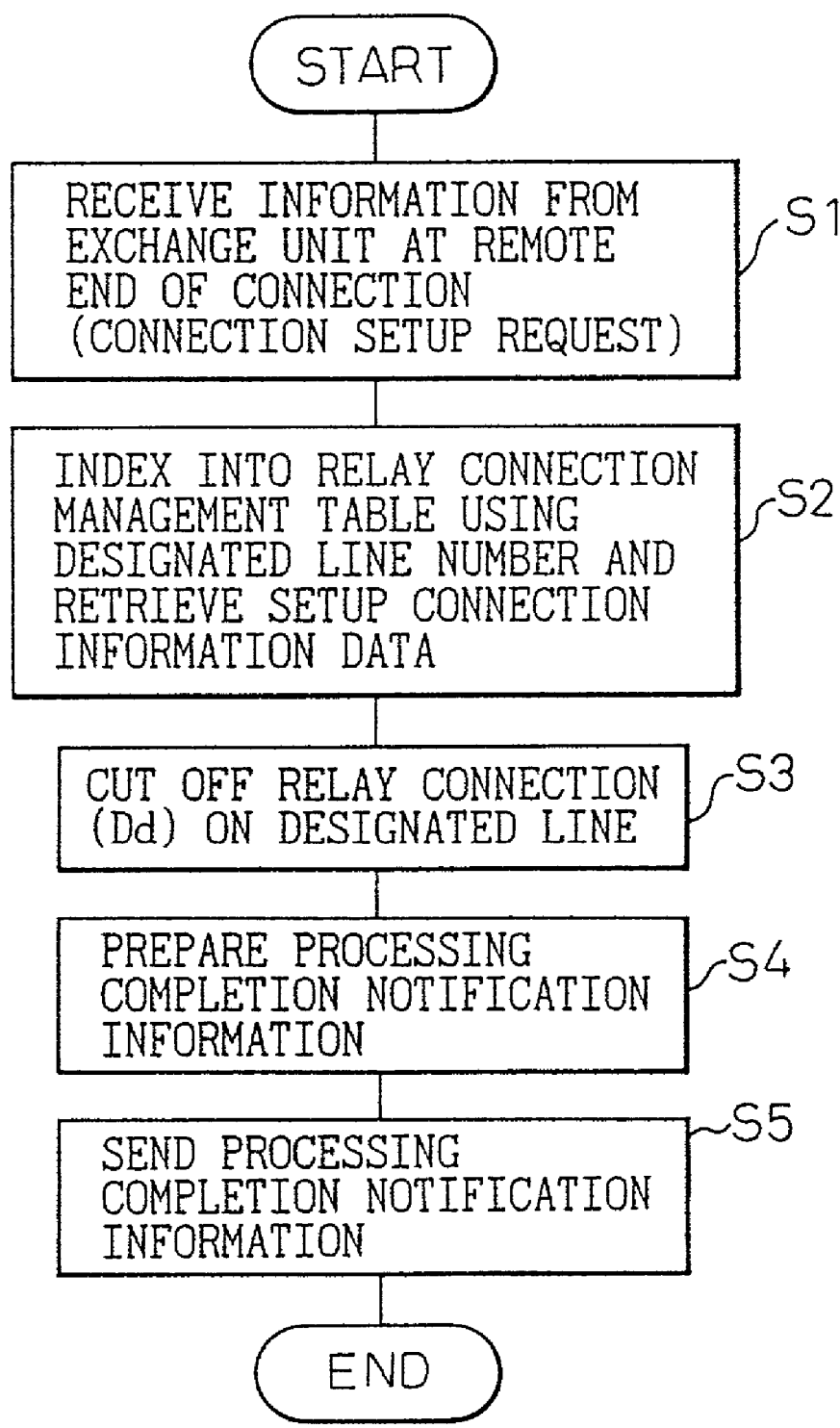
FIG. 24 is a flowchart illustrating the operation of the exchange unit D.

FIG. 22 is a block diagram for explaining the operation for automatically switching a connection between the exchange units A and C to a connection passing through the exchange unit D, and FIGS. 23 and 24 are flowcharts illustrating the operation performed at the respective exchange units to accomplish the switchover.

A line to be backed up, a reserve line as an backup line, and connections to be backed up on the line are set in advance from the maintenance console 7 connected to each exchange unit.

When a line failure occurs on the line Y while the communication terminals a and c are communicating via the communication path Ac-Cc, the relay connection switchover processing blocks A3 and C3 in the exchange units A and C recognize that the node at the remote end of the reserve line for the failed line is the exchange unit D by referring to the relay connection management tables A5 and C5, and request the respective information transmitting blocks A8 and C8 to edit the switchover request information and send out the information.

The information transmitting blocks A8 and C8 send the switchover request information to the exchange unit D, and the exchange units A and C wait for a processing completion notification from the exchange unit D. When the switchover request information is received from the exchange units A and C, the information receiving block D9 in the exchange unit D notifies the relay connection switchover processing block D3 accordingly.

The notified relay connection switchover processing block D3 retrieves the relay connection Dd on the reserve line from the relay connection management table D5, and requests the designated relay connection setup block D11 to set up the connection and, when the set up processing is completed, the information transmitting block D8 transmits the processing completion notification to the exchange units A and C.

Upon receiving the processing completion notification from the exchange unit D, the exchange units A and C resume the switchover operation. The relay connection switchover processing block A3 in the exchange unit A carries out the switchover from the connection Ac to the connection Ad, and the relay connection switchover processing block C3 in the exchange unit C carries out the switchover from the connection Cc to the connection Cd, to complete the switchover operation.

FIG. 23 is a flowchart illustrating the operation performed at the exchange units A and C to accomplish the above switchover. The operation will be described, taking the exchange unit A as an example. First, a periodic communication cell is sent to the exchange unit D (S1), and then the exchange unit A checks whether a response cell is received within a prescribed time (S2). If no response cell is received within the prescribed time, a no-response notification is sent to the line failure detection block A2 (S3).

The line failure detection block A2 checks whether the no-response notification has been received more than a specified number of times (S4); if it has exceeded the specified number of times, backup connection information data is retrieved by indexing into the relay connection management table A5 using the failed line number (S5). The information analyzing block A10 prepares the connection setup request information (S6), and sends the connection setup request information to the remote unit (S7).

Next, the exchange unit A checks whether a processing completion notification is received (S8). If the processing completion notification is received, the relay connections Ac and Cc on the failed line are cut off (S9), and the relay connections Ad and Cd on the reserve line are set up (S10).

FIG. 24 is a flowchart illustrating the operation of the exchange unit D. First, connection setup information is received from the exchange unit at the remote end of the connection (S1). When the information is received, the exchange unit D retrieves setup connection information data by indexing into the relay connection management table D5 using the designated line number (S2). Next, the relay connection Dd on the designated line is set up (S3), and the information analyzing block D10 prepares the processing completion notification information (S4), which is transmitted to the remote unit (C or D) (S5).

Figure 25:
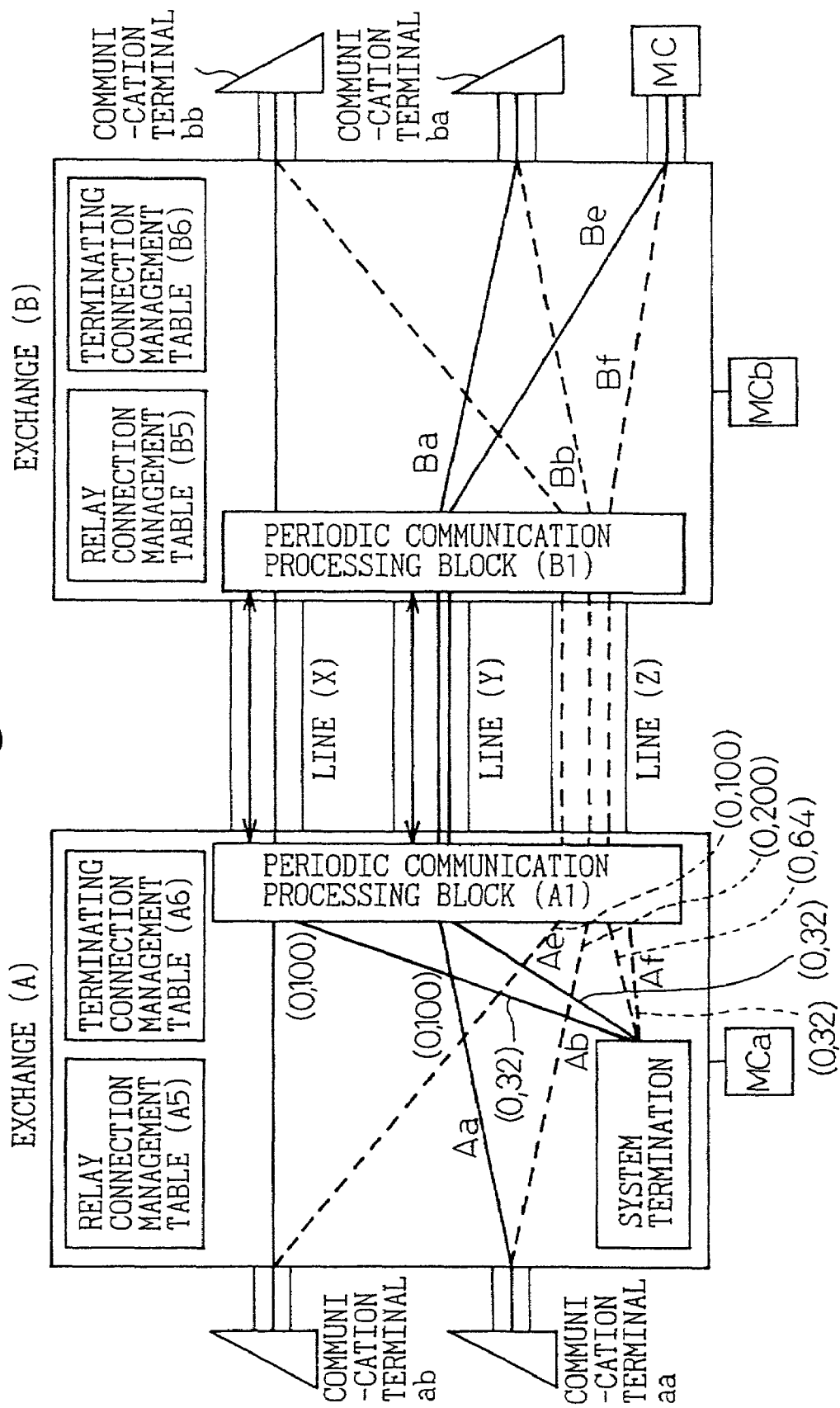
FIG. 25 is a diagram for explaining how reserve lines for a plurality of lines can be concentrated onto one line in the present invention.
Figure 27A:
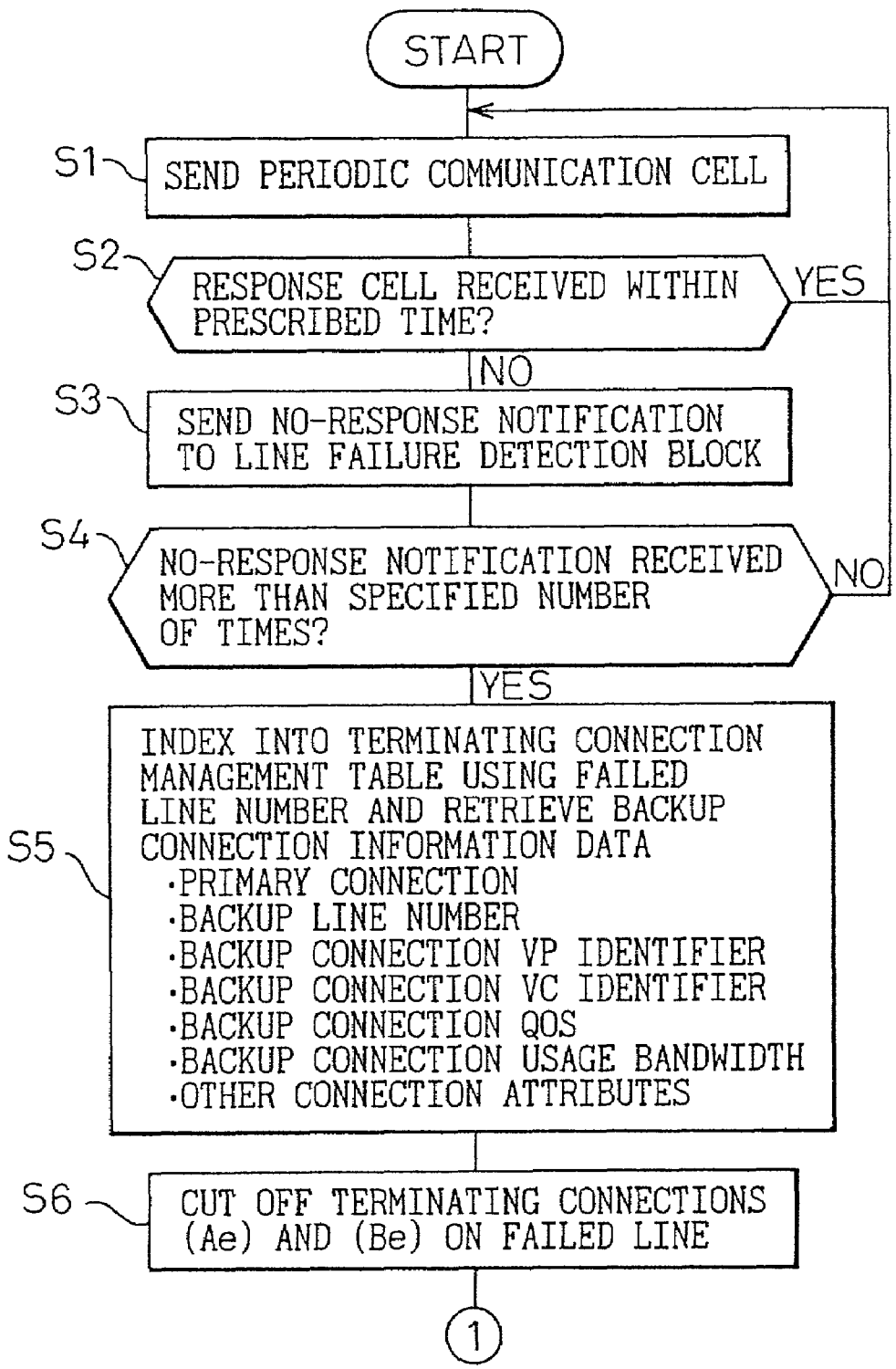
FIGS. 27A and 27B are flowcharts illustrating the operation performed at the respective exchange units.
Figure 27B:
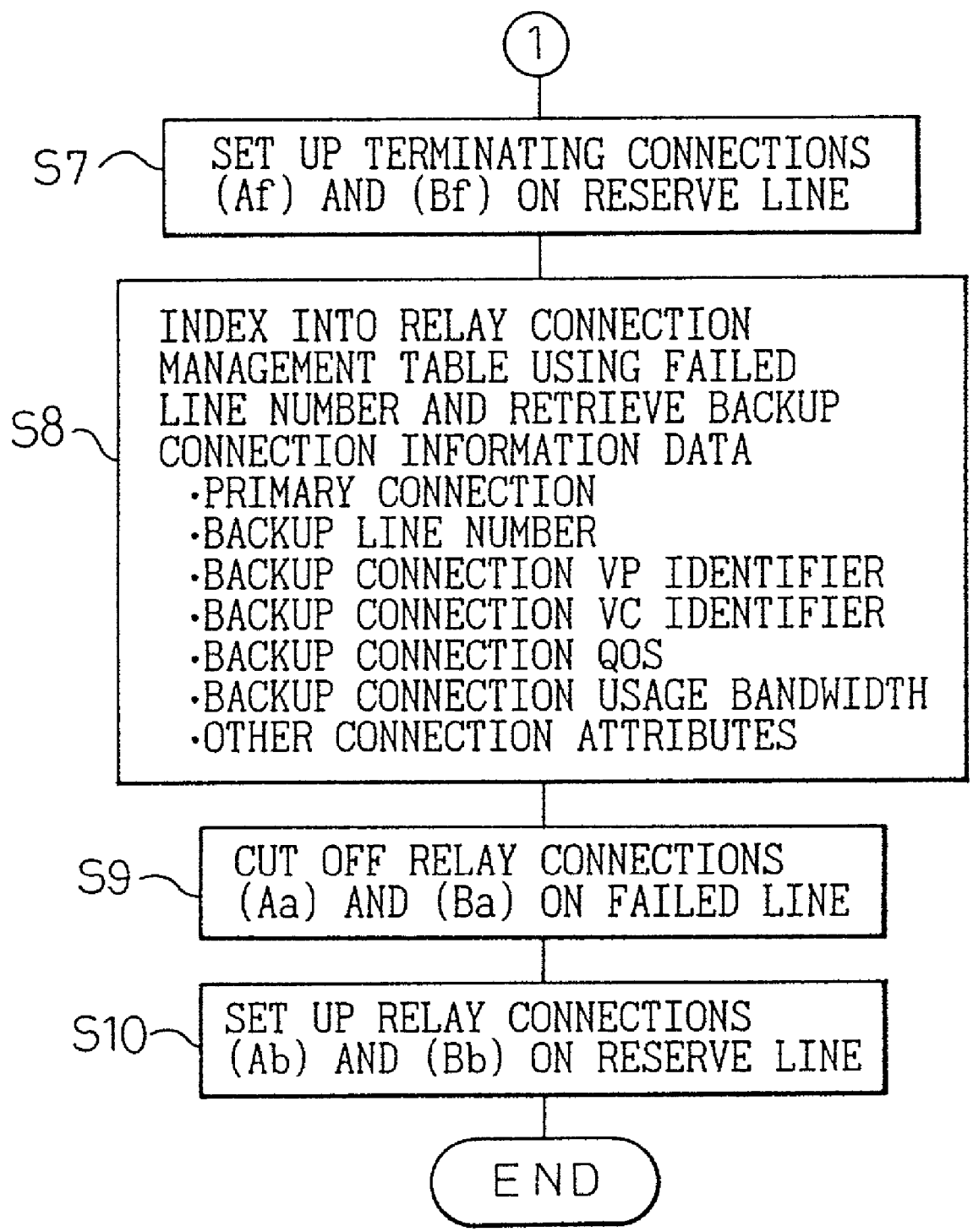

FIG. 25 is a block diagram for explaining how reserve lines for a plurality of lines can be concentrated onto one line in the present invention, FIGS. 26A and 26B are diagrams showing examples of the configuration of the relay connection management table and terminating connection management table for achieving the concentration, respectively, and FIGS. 27A and 27B are flowcharts illustrating the operation performed at the respective exchange units to achieve the concentration.

In FIG. 25, when the reserve line for the line X is Z and the reserve line for the line Y is also Z, for example, if the connection identifiers of a relay connection on the line X are VP=0 and VC=100 and the connection identifiers of a relay connection on the line Y are also VP=0 and VC=100, then the connection identifiers on the reserve line for the line Y are set as VP=0 and VC=200 (see FIG. 26A). Likewise, if the connection identifiers of a terminating connection on the line X are VP=0 and VC=32 and the connection identifiers of a terminating connection on the line Y are also VP=0 and VC=32, then the connection identifiers on the reserve line for the line Y are set as VP=0 and VC=64.

When the connections are switched simultaneously from the line X and line Y to the reserve line Z, two different relay connections, one with the connection identifiers VP=0 and VC=100 and the other with the connection identifiers VP=0 and VC=200, and two different terminating connections, one with the connection identifiers VP=0 and VC=32 and the other with the connection identifiers VP=0 and VC=64, are set up on the line Z. That is, the line X and line Y can be backed up by the same reserve line Z.

In FIGS. 27A and 27B, first a periodic communication cell is sent out (S1). Next, it is checked whether a response cell is received within a prescribed time (S2). If it is not received, a no-response notification is sent to the line failure detection block A2 (S3). The line failure detection block A2 counts the no-response notification, and checks whether the count value exceeds a specified value (S4).

If it exceeds the specified value, backup connection information data is retrieved by indexing into the terminating connection management table A6 using the failed line number. The information consists of primary connection, backup line number, backup connection VP identifier, backup connection VC identifier, backup connection QOS, backup connection usage bandwidth, and other connection attributes.

Next, the terminating connections Ae and Be on the failed line are cut off (S6). Then, the terminating connections Af and Bf on the reserve line are set up (S7), and backup connection information data is retrieved by indexing into the relay connection management table A5 using the failed line number (S8). The information consists of primary connection, backup line number, backup connection VP identifier, backup connection VC identifier, backup connection QOS, backup connection usage bandwidth, and other connection attributes.

Next, the relay connections Aa and Ba on the failed line are cut off (S9), and the relay connections Ab and Bb on the reserve line are set up (S10).

According to the present invention thus far described, in the event of the occurrence of a physical failure in an ATM network or a software or hardware failure within an ATM exchange, the failure can be detected reliably by using simple control signals without the need for complicated software control, and connections on the failed line can be quickly switched to a backup line.

Furthermore, the present invention provides a flexible backup method by making centralized switchover control possible through manual maintenance operations, and by enabling connections within a plurality of exchange units to be switched in a synchronized fashion, and so on.

The invention claimed is:

1. A line backup method comprising the steps of:
    setting up a first connection as a permanent virtual connection on a line connecting between a first exchange unit and a second exchange unit;
    performing periodic communications between said first exchange unit and said second exchange unit using said first connection;
    detecting a failure of said line by monitoring said periodic communications at each of said first and second exchange units, wherein a failure is detected when a count of no-response notifications each indicating a no-response resultine from a communication attempt between the first and second exchange units exceeds a predetermined value;
    switching a second connection on said line, at each of said first and second exchange units, to a reserve connection not using said line, in the event that a failure of said line is detected; and
    analyzing at said second exchange unit the condition of an opposite-end line directed to a third exchange unit when the second connection to be switched to a reserve connection at said second exchange is a connection to be relayed from said second exchange unit to said third exchange unit along said opposite-end line, and wherein;
    in said switching step, the reserve connection to be switched to is determined in accordance with the result of the analysis of said opposite-end line.

2. A line backup method in which a permanent virtual connection on a line connecting between a first exchange unit and a second exchange unit is switched over to a reserve permanent virtual connection not using said line, comprising the steps of:
    sending switchover request information from said first exchange unit to said second exchange unit in response to a manual switchover request from a maintenance console connected to said first exchange unit;
    switching said permanent virtual connection over to said reserve permanent virtual connection at said second exchange unit in response to said switchover request information, and sending a switchover completion notification from said second exchange unit to said first exchange unit;
    switching said permanent virtual connection over to said reserve permanent virtual connection at said first exchange unit in response to said switchover completion notification;
    sending switchover request information from said second exchange unit to a third exchange unit when the permanent virtual connection to be switched over to a reserve permanent virtual connection at said second exchange unit that received said switchover request information is a connection to be relayed from said second exchange unit to said third exchange unit; and
    switching said permanent virtual connection over to a reserve permanent virtual connection at said third exchange unit in response to said switchover request information, and sending response information from said third exchange unit to said second exchange unit.

3. A method according to claim 2, further comprising the step of prestoring for said permanent virtual connection an identifier of said reserve permanent virtual connection.

4. A line backup system comprising:
    a first connection set up as a permanent virtual connection on a line connecting between a first exchange unit and a second exchange unit;
    a periodic communication processing block for performing periodic communications between said first exchange unit and said second exchange unit using said first connection;
    a line failure detection block for detecting a failure of said line by monitoring said periodic communications at each of said first and second exchange units, said line failure detection block detecting a failure by counting a number of no-response notifications each sent by the periodic communication processing block to report a no-response from a communication attempt between the first and second exchange units, and determining a line failure when the number of no-response. notifications counted exceeds a predetermined value;
    a switchover processing block for switching a second connection on said line, at each of said first and second exchange units, to a reserve connection not using said line, in the event that a failure of said line is detected; and
    an opposite-end line condition analyzing block for analyzing at said second exchange unit the condition of an opposite-end line directed to a third exchange unit when the second connection to be switched over to a reserve connection at said second exchange unit is a connection to be relayed from said second exchange unit to said third exchange unit along said opposite-end line, and wherein:
    said switchover processing block determines the reserve connection to be switched to in accordance with the result of the analysis from said opposite-end line condition analyzing block.

5. A line backup system in which a permanent virtual connection on a line connecting between a first exchange unit and a second exchange unit is switched over to a reserve permanent virtual connection not using said line. comprising:
    an information transmitting block for sending switchover request information from said first exchange unit to said second exchange unit in response to a manual switchover request from a maintenance console connected to said first exchange unit;

a connection switchover processing block for switching said permanent virtual connection over to said reserve permanent virtual connection at said second exchange unit in response to said switchover request information;

a second information transmitting block for sending a switchover completion notification from said second exchange unit to said first exchange unit; and a second connection switchover processing block for switching said permanent virtual connection over to said reserve permanent virtual connection at said first exchange unit in response to said switchover completion notification;

wherein said second information transmitting block sends switchover request information from said second exchange unit to a third exchange unit when the permanent virtual connection to be switched over to a reserve permanent virtual connection at said second exchange unit that received said switchover request information is a connection to be relayed from said second exchange unit to said third exchange unit, said system further comprising:

a third connection switchover processing block for switching said permanent virtual connection over to a reserve permanent virtual connection at said third exchange unit in response to said switchover request information; and a third information transmitting block for sending response information from said third exchange unit to said second exchange unit.

6. The system according to claim 5, further comprising a connection management table in which an identifier of said reserve permanent virtual connection is prestored for said connection.

* * * * *